(12) United States Patent
Neiger et al.

(10) Patent No.: US 12,248,800 B2
(45) Date of Patent: Mar. 11, 2025

(54) VIRTUALIZATION OF INTERPROCESSOR INTERRUPTS

(71) Applicant: Intel Corporation, Santa Clara, CA (US)

(72) Inventors: Gilbert Neiger, Portland, OR (US); Rajesh Sankaran, Portland, OR (US); Hisham Shafi, Akko (IL)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 17/561,433

(22) Filed: Dec. 23, 2021

(65) Prior Publication Data

US 2022/0365802 A1 Nov. 17, 2022

Related U.S. Application Data

(60) Provisional application No. 63/189,616, filed on May 17, 2021.

(51) Int. Cl.
*G06F 9/455* (2018.01)
*G06F 13/24* (2006.01)

(52) U.S. Cl.
CPC .......... *G06F 9/45558* (2013.01); *G06F 13/24* (2013.01); *G06F 2213/24* (2013.01)

(58) Field of Classification Search
CPC ... G06F 9/45558; G06F 13/24; G06F 2213/24
See application file for complete search history.

(56) References Cited

U.S. PATENT DOCUMENTS

| 2010/0191888 | A1 | 7/2010 | Serebrin et al. |
| 2017/0206177 | A1 | 7/2017 | Tsai et al. |
| 2020/0409735 | A1 | 12/2020 | Grandhi et al. |

OTHER PUBLICATIONS

European Search Report and Search Opinion, EP App. No. 22165411. 4, Aug. 19, 2022, 11 pages.

*Primary Examiner* — Gregory A Kessler
(74) *Attorney, Agent, or Firm* — Nicholson De Vos Webster & Elliott LLP

(57) ABSTRACT

Embodiments of apparatuses, methods, and systems for virtualization of interprocessor interrupts are disclosed. In an embodiment, an apparatus includes a plurality of processor cores; an interrupt controller register; and logic to, in response to a write from a virtual machine to the interrupt controller register, record an interprocessor interrupt in a first data structure configured by a virtual machine monitor and send a notification of the interprocessor interrupt to at least one of the plurality of processor cores.

16 Claims, 18 Drawing Sheets

METHOD
160

Configure data structure to record/post IPIs 162

Configure ICR 164

Write to ICR 170

Record IPI 172

Send notification of IPI 174

SENDUIPI — Send User Interprocessor Interrupts

| Opcode/ Instruction | Op/ En | 64/32 bit Mode Support | CPUID Feature Flag | Description |
|---|---|---|---|---|
| F3 0F C7 /6 SENDUIPI reg | A | V/I | UINTR | Send interprocessor user interrupt. |

Instruction Operand Encoding

| Op/En | Tuple | Operand 1 | Operand 2 | Operand 3 | Operand 4 |
|---|---|---|---|---|---|
| A | NA | ModRMreg (r, w) | NA | NA | NA |

Description

The SENDUIPI instruction takes a single register operand. The operand always has 64 bits; operand-size overrides (e.g., the prefix 66) are ignored.

Although SENDUIPI may be executed at any privilege level, all of the instruction's memory accesses are performed with supervisor privilege.

Virtualization of the SENDUIPI instruction (in particular, that of the sending of the notification interrupt) is discussed in Section 11.9.2.5.

The Operation section refers to the values UITTADDR and UITTSZ. The values are defined in Section 11.3.1. It also includes operations on a user posted-interrupt descriptor (UPID). The format of a UPID is defined in Section 11.5.

Operation

```
IF reg > UITTSZ;
    THEN #GP(0);
FI;
read tempUITTE from 16 bytes at UITTADDR + (reg << 4)
IF tempUITTE.V = 0 or tempUITTE sets any reserved bit (see Section 11.7.1)
    THEN #GP(0);
FI;
read tempUPID from 16 bytes at tempUITTE.UPIDADDR;// under lock
IF tempUPID sets any reserved bits or bits that must be zero (see Table 11-1)
    THEN #GP(0) // release lock
FI;
tempUPID.PIR[tempUITTE.UV] := 1;
IF tempUPID.SN = tempUPID.ON = 0
    THEN
        tempUPID.ON := 1;
        sendNotify := 1;
    ELSE sendNotify := 0;
FI;
write tempUPID to 16 bytes at tempUITTE.UPIDADDR;// release lock
IF sendNotify = 1
    THEN
        IF local APIC is in x2APIC mode
            THEN send ordinary IPI with vector tempUPID.NV
                to 32-bit physical APIC ID tempUPID.NDST;
            ELSE send ordinary IPI with vector tempUPID.NV
                to 8-bit physical APIC ID tempUPID.NDST[15:8];
        FI;
FI;
```

FIG. 3

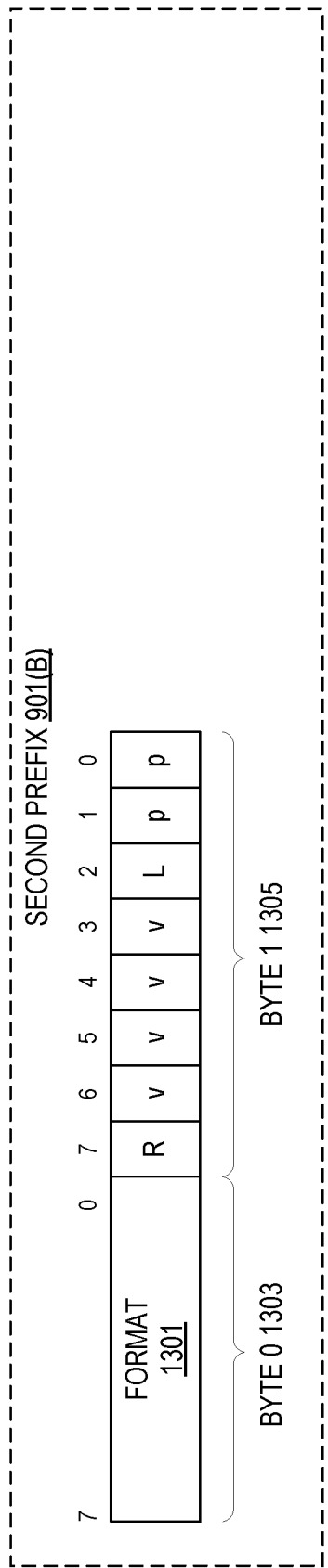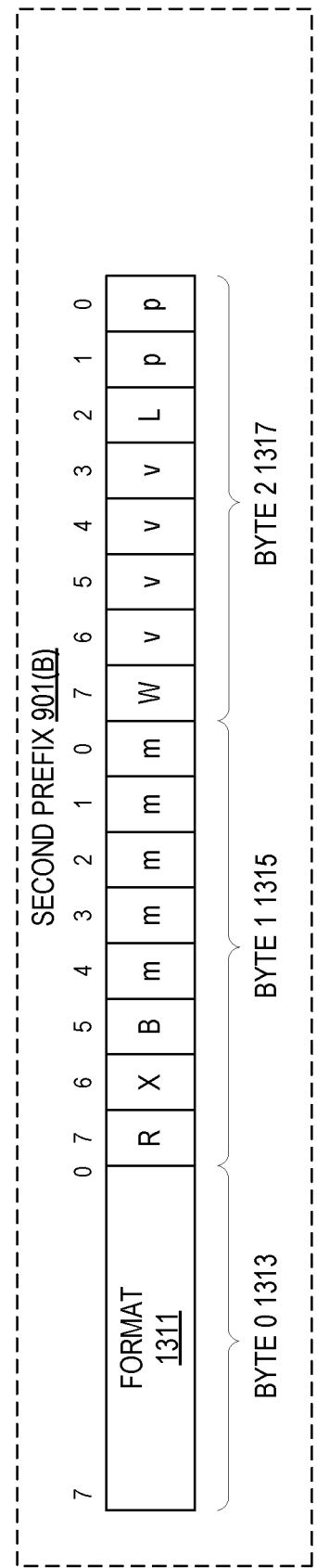

VIRTUALIZATION OF INTERPROCESSOR INTERRUPTS

FIELD OF INVENTION

The field of invention relates generally to information processing, and, more specifically, but without limitation, to processor architecture.

BACKGROUND

In computers and other information processing systems, an operating system (OS) may send an interprocessor interrupt (IPI) by writing to a hardware control register (e.g., in an interrupt controller).

BRIEF DESCRIPTION OF DRAWINGS

Various embodiments in accordance with the present disclosure will be described with reference to the drawings.

FIG. 3 illustrates embodiments of an instruction to send a user interprocessor interrupt according to embodiments.

FIGS. 13(A), 13(B), and 14 illustrate prefixes of an instruction format according to embodiments.

DETAILED DESCRIPTION

Figure 1A:
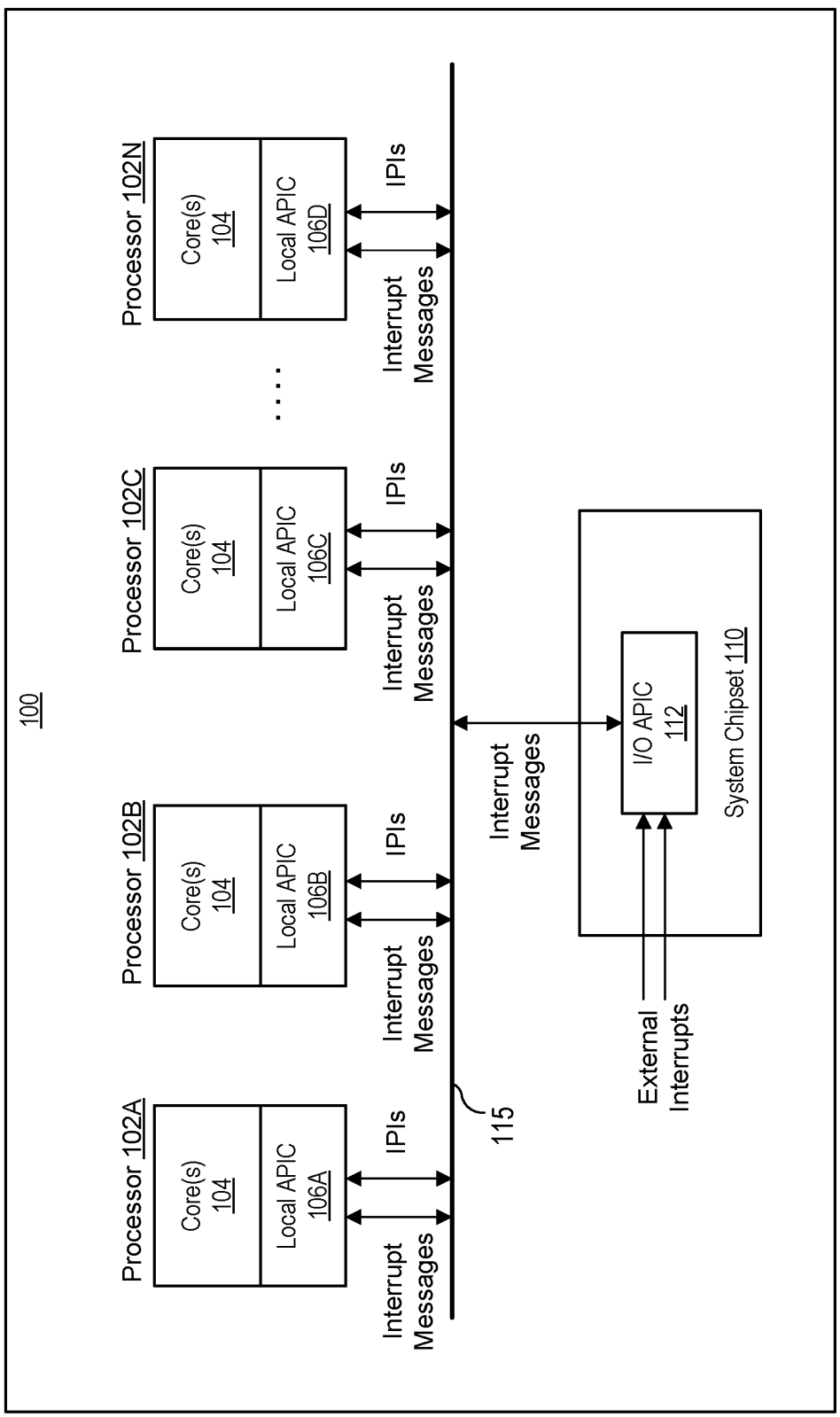
FIG. 1A is a block diagram illustrating a system having processors that employ local advanced programmable interrupt controllers, according to embodiments.

The present disclosure relates to methods, apparatus, systems, and non-transitory computer-readable storage media for the virtualization of interprocessor interrupts and/or their handling.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that an embodiment may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "cleared" may refer to the state after the storing or causing has occurred. The term "set" may be used to indicate storing or otherwise causing the logical value of one, all ones, or some other specified value to be stored in a storage location, and the term "set" may also refer to the state after the storing or causing has occurred. However, these terms are not meant to limit embodiments of the present invention to any particular logical convention, as any logical convention may be used within embodiments of the present invention.

An operating system (OS) may send an interprocessor interrupt (IPI) by writing to a hardware control register (e.g., in an interrupt controller). In some scenarios, when the OS is operating in a virtual machine (VM) the OS is not allowed to write directly to the control register. Rather, that register remains under control of the virtual-machine monitor (VMM) or hypervisor. The VMM intercepts these register writes (with a control-flow transfer sometimes called a VM exit) and emulates them. This can result in unacceptable overhead for workloads in which IPIs are set with high frequency. It may also be undesirable for usages that require a VM to operate with a minimum number of VM exits.

In some embodiments, a feature is described that, when enabled, changes the treatment of any write to the interrupt-controller register that sends an IPI. Specifically, the CPU will record the interrupt to be sent in a data structure configured by the VMM for the target virtual CPU (vCPU) and, when appropriate, will send a VMM-configured notification interrupt to the logical processor on which the vCPU is operating. This behavior is compatible with existing mechanisms to virtualize device interrupts and, like those mechanisms, interfaces with other features that ensure delivery of the virtual IPI. Accordingly, embodiments may be described using references to Intel® Virtualization Technology (VT), Intel® Virtual Machine Extensions (VMX), Intel® 64 and IA-32 Architecture, etc., but embodiments are not limited by these details.

By allowing a virtual machine to send IPIs without a VM exit, the invention avoids the performance overhead of existing solutions. Because operations compatible with mechanisms to virtualize device interrupts are performed, it affords VMM software a uniform methodology to virtualize interrupts of all types. Embodiments detailed herein apply also to notification IPIs that may be sent in response to an instruction to send a user IPI (as part of user-interrupt feature set) and will thus protect the essential low-latency property of that instruction.

Embodiments detailed herein describe an architectural feature and part of an instruction-set architecture (ISA).

Aspects of the disclosure are directed to a system and methods for enhancing local advanced programmable interrupt controller (APIC) logic in order for a VMM to provide local APIC pass-through to one or more VMs. Pass-through of the local APIC means that the VMM need not trap and emulate the functioning of the local APIC (e.g., via virtualization of the local APIC) for the VM to send inter-processor interrupts (IPIs) to core(s) on which the VM is executing. In order to provide such pass-through of the local APIC to the VM, the VM is to be trusted in terms of allowing the VM to directly issue IPIs that are forwarded to destination core(s). A VM may generally be trusted to send IPIs to the same core(s) on which the VM is executing.

System software (e.g., a guest OS) or application of the VM) may write to an interrupt command register (ICR) to send IPIs between cores. In a configuration where the VMM provides direct access to the local APIC to a VM, the writes to the ICR may be virtualized in the processor in order to verify that the IPI is directed to a core on which the VM is executing. Any core of a subset of cores on which the VM is executing is a valid (or authorized) destination to which the VM may send an IPI. To check that a core is a valid destination, APIC identifiers (IDs) of the cores within the subset of cores (for a the VM) may be associated, in a data structure stored in a memory buffer, with a cluster identifier (ID) of a cluster within the subset of cores. In this way, the data structure may embody a local APIC processor map for each VM on a computing platform. In some embodiments, the data structure is a table, for example. This data structure may be cross-referenced against the values stored within the ICR before the IPI is forwarded on a system bus that couples together the multiple cores of a multi-core processor.

In some embodiments, to send an IPI to one or more of the cores, a guest OS of the VM may write values to the ICR. These values may include, for example, values for a destination field that identifies one or more destination cores; a destination mode (either physical or logical); and a destination shorthand (e.g., self, all including self, or all excluding self with reference to the core that initiates the IPI). The local APIC may then, as part of handling such an IPI stored in the ICR, verify that the local interrupt controller pass-through field has been set and that the pointer and the number of the one or more entries in the VMCS are non-zero. This signals to local APIC logic that virtualization pass-through of the local APIC is enabled and set up. The local APIC logic may then be employed to determine, with access to the data structure previously set up by the VMM in memory (to which the pointer is directed), whether an IPI that has been written to the ICR is directed to an authorized core of the subset of cores for the VM that stored the values in the ICR. In this way, no VM can send a storm of IPIs (e.g., perform a denial-of-service type of attack) to cores outside of its domain.

FIG. 1A is a block diagram illustrating a computing platform 100 (e.g., system) having processors 102A, 102B, 102C, . . . 102N that employ local advanced programmable interrupt controllers (APIC) 106A, 106B, 106C, . . . 106N, respectively, according to one implementation. The local APIC may variably be referred to as a local interrupt controller or programmable interrupt controller for simplicity. Each processor may include one or more cores 104, and thus be a multi-core processor. The computing platform 100 may further include a system chipset 110 that includes an I/O APIC 112, which may generate I/O interrupts based on external interrupts or internal signals from the computing platform 100.

In implementations, the computing platform 100 may further include a system bus 115 that is to couple the processors 102, the cores 104, and the system chipset 110. Interrupt messages may be sent back and forth between the system bus 115 and the I/O APIC 112 of the system chipset 110, for example. Interrupt messages and IPIs may also be sent between the local APICs and the system bus 115, and therefore may be sent between the processors and the cores.

In various implementations, each local APIC 106A, 106B, 106C, . . . 106N handles interrupts from the I/O APIC 112, IPIs from processors on the system bus 115, and self-generated interrupts. Interrupts may also be delivered to the individual processors through local interrupt pins; however, this mechanism is commonly not used in multi-processor systems. The IPI mechanism is typically used in multi-processor systems to send fixed interrupts (interrupts for a specific vector number) and special-purpose interrupts to processors on the system bus 115. For example, a local APIC may use an IPI to forward a fixed interrupt to another processor for servicing. Special-purpose IPIs (including non-maskable interrupt (NMI), initialization interrupt (INIT), system management interrupt (SMI), and startup inter-processor interrupt (SIPI) IPIs) allow one or more processors on the system bus to perform system-wide boot-up and control functions.

Figure 1B:
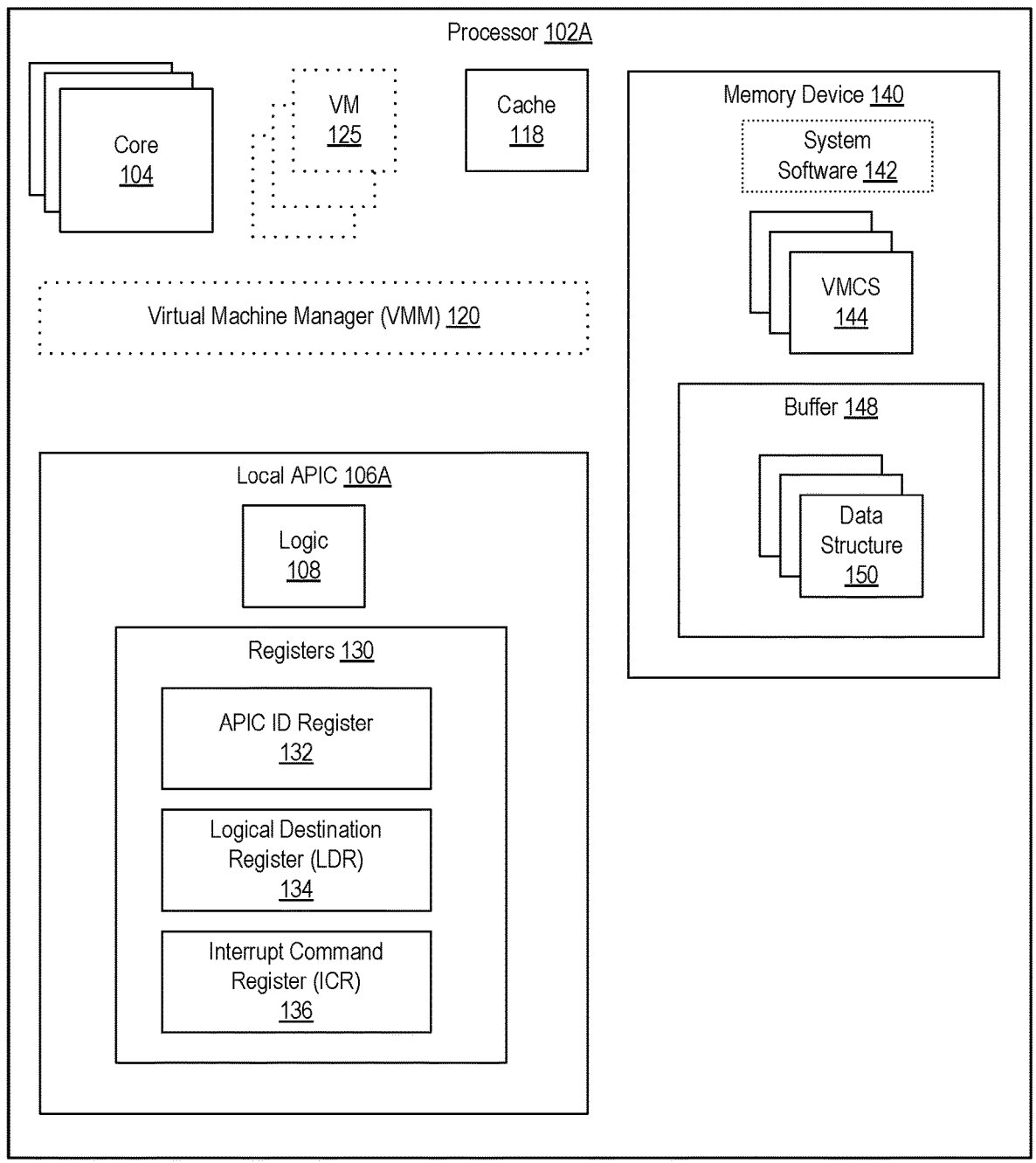
FIG. 1B is block diagram illustrating a processor according to embodiments.

FIG. 1B is block diagram illustrating one of the processors 102A illustrated in FIG. 1A, according to one implementation. The processor 102A includes one or more cores 104, cache 118, the local APIC 106A (e.g., local interrupt controller), and a memory device 140 (e.g., memory). The one or more cores 104 may execute a virtual machine monitor (VMM) 120 and one or more virtual machine (VMs) 125.

Figure 2:
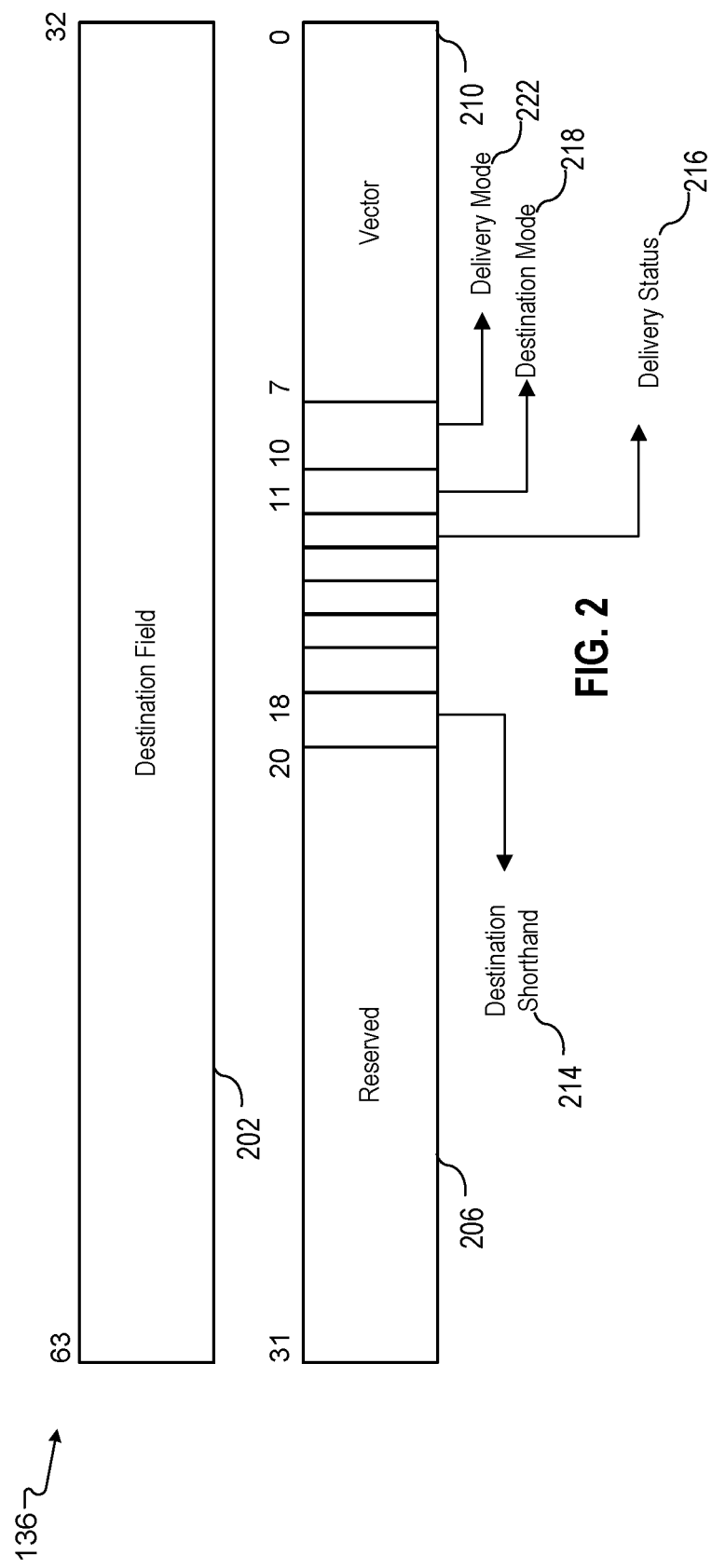
FIG. 2 is a diagram of a format structure for an interrupt command register into which a guest of a virtual machine may write to send an interprocessor interrupt to a destination core, according to embodiments.

In various implementations, the local APIC 106A includes interrupt controller logic 108, which includes local APIC pass-through logic, and a number of registers 130, such as model-specific registers (MSRs). The interrupt controller logic 108 may be hardware, firmware, or a combination of hardware and firmware. The registers 130 may include, but are not limited, to an APIC ID register 132, a local destination register (LDR) 134, and an interrupt command register (ICR) 136. The APIC ID register 132 may store one or more interrupt controller IDs, each of which is related to a core 104 or a cluster of cores 104. A cluster is also referred to as a logical processor and may be identified as the entity on which one or more software programs execute, such as a VM 125. The LDR 134 may store a logical value that is associated with two separate identifiers, including the cluster ID and the APIC ID, which may be read by software running on the VM 125. The ICR 136 is writable by the VM 125 in order to send an IPI onto the system bus 115. The ICR 136 is illustrated in FIG. 2 and discussed in more detail hereinafter.

In implementations, the memory device 140 is to store system software 142, a VMCS 144 for each VM 125, and a buffer 148. The buffer 148 may be partitioned into one or more data structures 150, such as a table or indexed/partitioned portion of memory. The data structure 150 may also be stored in a register, whether an MSR or a memory-based register, in other implementations. In implementations, the memory device 130 is any of dynamic random-access memory (DRAM), synchronous DRAM (SDRAM), a static memory, such as static random-access memory (SRAM), a flash memory, a data storage device, or a combination of such memory devices. For brevity, the memory device 140 is also simply referred to as memory 140. As discussed, the VMM 120 may store values in the VMCS 144 to set up virtualization of local APIC pass-through. These values may include a physical address of a pointer to the data structure, a number of the one or more entries in the data structure, and a setting or flag for a local interrupt controller pass-through field that, when set, may indicate virtualization pass-through of the local APIC for the VM.

The interrupt controller logic 108 may access the values stored in the ICR 136 in addition to those stored in the VMCS 144 for a particular VM 125 in order to decide whether an IPI written to the ICR 136 may be sent onto the system bus 115. For example, if the interrupt controller logic 108 verifies that the destination core of the IPI is included within the subset of the cores that execute the VM 125, the IPI written to the ICR 136 may be sent to the destination core on the system bus 115.

Figure 1C:
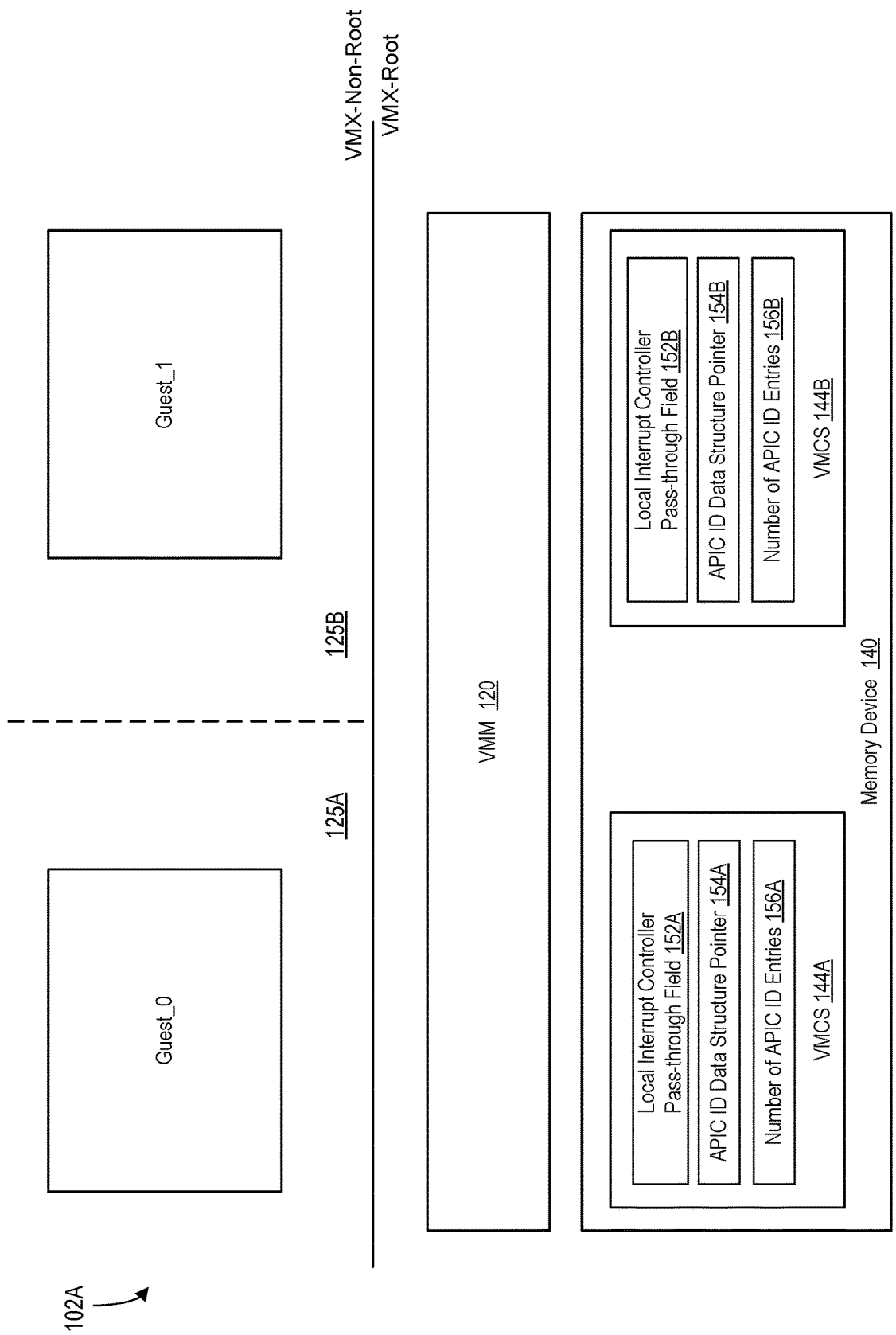
FIG. 1C is a block diagram of a virtual machine monitor running two virtual machines with access to a virtual machine structure for each virtual machine, according to embodiments.

FIG. 1C is a block diagram of the VMM running two VMs, e.g., a first VM 125A and a second VM 125B with access to a virtual machine structure (VMCS) for each VM, according to implementations of the disclosure. The first VM 125A may execute a first guest OS (guest_0) and the second VM 125B may execute a second guest OS (guest_1). In configuring hardware and software resources for each VM, the VMM 120 may set up a first VMCS 144A for the first VM 125A and a second VMCS 144B for the second VM 125B.

As part of the configuration for the first VM 125A, implementations of the disclosure include the VMM 120 setting (or not setting) a value or flag of a first local interrupt controller pass-through field 152A, a value for a first APIC ID data structure pointer 154A, and a value of a first number of APIC ID entries 156A. As part of the configuration for the second VM 125B, implementations of the disclosure include the VMM 120 setting (or not setting) a value or flag of a second local interrupt controller pass-through field 152B, a value for a second APIC ID data structure pointer 154B, and a value of a second number of APIC ID entries 156B.

In some embodiments, software sends an interprocessor interrupt (IPI) by writing to the interrupt command register (ICR) of the local APIC. In some embodiments, the ICR is a 64-bit register with the following format: bits 7:0 contain the interrupt vector; bits 10:8 determine the delivery mode (for IPIs, the delivery mode is typically "fixed" (e.g., value 0)); bit 11 determines the destination mode (e.g., 0=physical; 1=logical); bit 12 reports delivery status (in embodiments, the value written by software is not used; in embodiments, this bit is not used in x2APIC mode (as described below); bit 14 is used only for INIT level de-assert delivery mode and is otherwise value 1; bit 15 determines the trigger mode (or IPIs, the trigger mode is typically "edge" (e.g., value 0)); bits 19:18 determine any destination shorthand (e.g., values include 0 for "no shorthand" and 1 for "self"); and/or bits 63:32 determine the IPI destination.

Figure 1D:
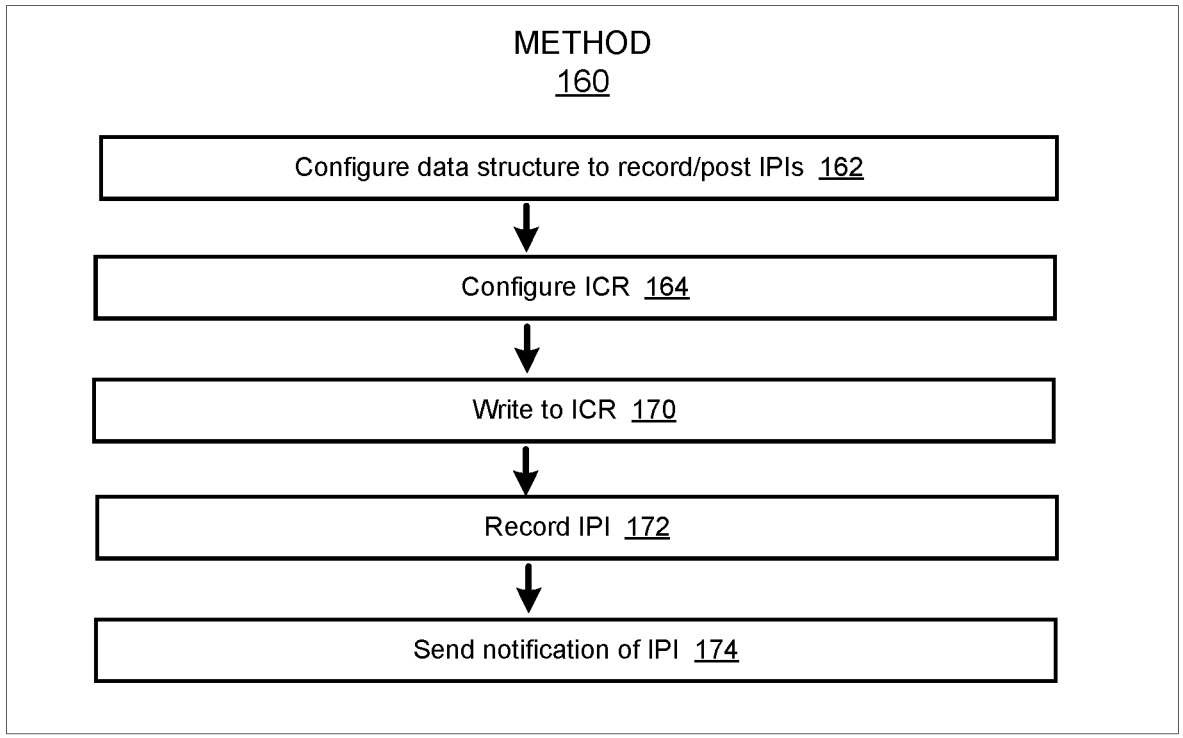
FIG. 1D is a flow diagram of a method for virtualizing interprocessor interrupts according to embodiments.

FIG. 1D is a flow diagram of a method 160 for virtualizing IPIs according to embodiments. In block 162 of method 160, a VMM configures a data structure to record/post IPIs. In block 164, an ICR is configured to send an IPI from a VM.

In block 170, software running on the VM writes to the ICR. In block 172, in response to block 170, the IPI is recorded/posted (e.g., by logic 108 in local APIC 106A) in the data structure. In block 174, in response to block 170, a notification of the IPI is sent (e.g., by logic 108 in local APIC 106A) to at least one of a plurality of processor cores.

FIG. 2 is a diagram of a format structure for the interrupt command register (ICR) 136 into which a guest of a VM (e.g., VM 125) is to write to send an IPI to a destination core according to some embodiments. The ICR 136 may be formatted in different sizes, but in some embodiments, includes a 32-bit destination field 202, a 12-bit reserved field 206, an 8-bit vector field 210, and a number of smaller fields, which may include a destination shorthand field 214, a delivery status field 216, a destination mode field 218, and a delivery mode field 222.

In various implementations, the destination field 202 is programmed with a value that represents the interrupt controller (or APIC) ID of the destination core. The destination mode field 218 may be set to physical (e.g., "0") or logical (e.g., "1"), although these values may be reversed in alternative embodiments. Further, the destination shorthand field 214 may be set to a value that represents one of the destination shorthand settings listed in Table 1, although these values may be changed or swapped in other embodiments.

TABLE 1

| Destination Shorthand Value | Description |
| --- | --- |
| 00 | No Shorthand |
| 01 | Self |
| 10 | All Including Self |
| 11 | All Excluding Self |

If the value for "no shorthand" is in the destination shorthand field 214, the interrupt controller logic 108 may read the destination core(s) from the destination field 202. This process varies depending on whether the destination mode field 218 is set to physical or logical, as the value in the destination field 202 is to first be converted before being used to determine the destination core(s). Otherwise, a destination shorthand approach will be taken with another setting, such as "self," "all including self," or "all excluding self."

With "self" set as the destination shorthand, the only destination core is the same core that issues the IPI, allowing software to interrupt the core on which it is executing. An APIC implementation is free to deliver the self-interrupt message internally or to issue the message to the system bus 115 and "snoop" (e.g., monitor) the system bus 115 as with any other IPI message. With "all including self" set as the destination shorthand, the IPI is sent to all cores in the system including the core sending the IPI.

With "all excluding self" set as the destination shorthand, the IPI is sent to all cores in a system with the exception of the core sending the IPI. Support for this destination shorthand in conjunction with the lowest-priority delivery mode is model specific. For some processors, when the "all excluding self" shorthand is used together with lowest priority delivery mode, the IPI may be redirected back to the issuing core.

In various implementations, the delivery mode field 222 may be set to a number of values selected as illustrated in Table 2, although these values may be altered or interchanged in other implementations.

TABLE 2

| Delivery Mode Value | Description |
| --- | --- |
| 000 | Fixed |
| 001 | Lowest Priority |
| 010 | SMI |
| 011 | Reserved |
| 100 | NMI |
| 101 | INIT |
| 110 | Start Up |
| 111 | Reserved |

Bit position 12 may be used to indicate a delivery status 216.

The method by which software accesses the ICR depends on the mode of the local APIC in some embodiments. In some embodiments, in a first mode (e.g., xAPIC) mode, the APIC's control registers are accessed using memory accesses to the 4-KByte region of the physical address specified in a model specific register (MSR) (e.g., IA32_APIC_BASE_MSR) (the APIC page). The registers are written as 32-bit values, each at a 16-byte aligned address. The upper half (bits 63:32; the destination field) of the ICR (ICR_HI) are written at offset 310H on the APIC page. In the first mode, the APIC uses only the upper 8 bits of the destination field. The lower half (bits 31:0) of the ICR (ICR_LO) are written at offset 300H on the APIC page. It is the writing to ICR_LO that causes the APIC to send an IPI.

In a second mode (e.g., x2APIC mode), the APIC's control registers are accessed using an instruction (e.g., a write MSR or WRMSR instruction). All 64 bits of the ICR are written by using WRMSR to access the MSR with index 830H. If ECX=830H, WRMSR writes the 64-bit value in EDX:EAX to the ICR, causing the APIC to send an IPI. If any of bits 13, 17:16, or 31:20 is set in EAX, WRMSR detects a reserved-bit violation and causes a general-protection exception (#GP).

If the local APIC is in x2APIC mode, software can also send an IPI with destination shorthand "self" simply by using WRMSR to write an 8-bit interrupt vector to the MSR with index 83FH.

In some embodiments, an instruction (e.g., SENDUIPI) instruction may send an IPI by writing to the local APIC's ICR as detailed below.

In some embodiments, processor-based interrupt virtualization is supported using a virtual-APIC page in memory. This is a 4-KByte data structure with a format based on the hardware APIC's control-register space. Just as there is one hardware APIC for every logical processor, a VMM establishes a separate virtual-APIC page for every virtual processor. The physical address of virtual processor's virtual-APIC page is contained in a field in the virtual processor's VMCS.

This discussion uses the following notation to refer to fields on the virtual-APIC page: VICR_LO refers the 32-bit field at offset 300H on the virtual-APIC page. When the "virtual APIC accesses" VM-execution control is 1 (indicating virtualization of xAPIC mode), this field is used to virtualize the lower half of the ICR. VICR_HI refers the 32-bit field at offset 310H on the virtual-APIC page. When the "virtual APIC accesses" VM-execution control is 1 (indicating virtualization of xAPIC mode), this field is used to virtualize the upper half of the ICR. VICR refers the 64-bit field at offset 300H on the virtual-APIC page. When the "virtualize x2APIC mode" VM-execution control is 1 (indicating virtualization of x2APIC mode), this field is used to virtualize the entire ICR.

The virtual-APIC page can be used to virtualize some reads from and writes to APIC control registers (e.g., that control virtual-interrupt delivery, without causing a VM exit). This virtualization may be done by emulating the registers' functionality with corresponding fields on the virtual-APIC page. How it is done may depend on the APIC mode that is being virtualized: if the "virtualize APIC accesses" VM-execution control is 1, xAPIC mode is virtualized; if the "virtualize x2APIC mode" VM-execution control is 1, x2APIC mode is virtualized. VM entry fails if both controls are 1.

The following items outline how writes to APIC registers are virtualized in some embodiments. When "virtualize APIC accesses" is 1 (xAPIC virtualization), the processor uses another VMCS field called the APIC-access address. The processor recognizes writes to the 4-KByte range (the APIC-access page) at that physical address and treats them as APIC-register writes to be virtualized. One of three treatments applies to each write, depending on the APIC register and the settings of various VM-execution controls: 1) the write may cause a VM exit, called an APIC-access VM exit (such a VM exit is "fault-like," meaning that the affected instruction does not execute and that a pointer to it is saved as guest RIP in the VMCS); 2) the write may be redirected the virtual-APIC page (at the same offset as the access to the APIC-access page) and then a VM exit, called an APIC-write VM exit occurs (such a VM exit is "trap-like," meaning that the affected instruction has completed and that a pointer to the next instruction is saved as guest RIP in the VMCS); and/or 3) the write may be redirected to the virtual-APIC page (as above) and then emulated by the processor (this is done for only a small set of APIC registers associated with specific VM-execution controls in some embodiments); no VM exit occurs and control passes to the next instruction.

If "virtualize x2APIC mode" is 1 (x2APIC virtualization), the processor treats any execution of WRMSR for which the value of ECX is in the range 800H-8FFH as an APIC-register write. One of two treatments applies to each write, depending on the APIC register and the settings of various VM-execution controls: 1) for a small set of APIC registers associated with specific VM-execution controls, the write is redirected to the virtual-APIC page (at offset X=(reg & FFH)>>4, where reg is the index of the APIC MSR being written) and then emulated by the processor; 2) for any other APIC registers, the execution of WRMSR is directed to the actual APIC (in some embodiments, VMM software will prevent this treatment by using the MSR bitmaps).

Support for delivering virtual interrupts may be enabled by setting the "virtual-interrupt delivery" VM-execution control in the VMCS. When this control is set, the processor uses certain fields on the virtual-APIC page to track and prioritize virtual interrupts, and to determine when to deliver virtual interrupts to software operating in a virtual machine.

Specifically, in some embodiments, the processor uses virtual forms of the APIC's interrupt-request register (IRR) and in-service register (ISR) to track interrupts that are requesting service and that are in service, respectively. Each of these is a 256-entry bitmap, divided into eight discontiguous 32-bit sections. The processor maintains the virtual IRR (VIRR) and virtual ISR (VISR) correspondingly on the virtual-APIC page.

When the processor determines that a virtual interrupt should be delivered (based on the VIRR, VISR, and other state), it delivers the interrupt to guest software just as an ordinary interrupt would be delivered. Upon doing so, the processor also updates the virtual-APIC page just as APIC registers would be updated on ordinary interrupt delivery.

Certain platforms support a feature called virtual-interrupt posting by which certain hardware agents (e.g., an input/output memory management unit (IOMMU)) can direct virtual interrupts to a specific virtual processor.

The general idea is that an agent "posts" the interrupt in a data structure (posted-interrupt descriptor or PID) and then sends an interrupt (notification) to the logical processor on which the target virtual processor is operating. When that logical processor receives the notification, it uses information in the PID to deliver the virtual interrupt to the virtual processor.

The PID may be a 64-byte data structure. There is one PID for each virtual processor; the virtual processor's VMCS contains a pointer to its PID. A PID has the following format (other fields are not used): 1) bits 255:0: posted-interrupt requests (PIR) (there is a posted virtual interrupt for a vector if the corresponding bit is 1); 2) bits 319:256: notification information, organized as follows: bit 256: outstanding notification (ON) (if this bit is set, there is a notification outstanding for one or more posted interrupts in PIR), bit 257: suppress notify (SN) (setting this bit directs agents not to send notifications), bits 279:272: notify vector (NV) (notifications will use this vector), and bits 319:288: notify destination (NDST) (notifications will be directed to this physical APIC ID).

A hardware agent may post a virtual interrupt to a virtual processor as follows: 1) read the PIR field in the virtual processor's PID and write it back atomically, setting the bit in the virtual processor's PID that corresponds to the virtual interrupt's vector; 2) read the notification-information field in the PID and write it back atomically, setting the ON bit if the ON and SN bits were both 0 in the value read. (#2 is done atomically with #1 in some embodiments); 3) if #2 changed the ON bit from 0 to 1, send a notification. The notification is an ordinary interrupt sent to the physical APIC ID NDST with vector NV.

A logical processor recognizes as a notification any interrupt with the posted-interrupt notification vector (a field in the VMCS). When this occurs, the logical processor atomically reads and clears the current PID's PIR field as well as its ON bit. It then causes the virtual interrupts posted in the PIR field to be delivered to the virtual processor (using the virtual-interrupt delivery feature).

In some embodiments, the IPI virtualization feature has a logical processor (on which a sending virtual processor is running) post virtual interrupts in the same way that an IOMMU does and a notification is processed as follows: 1) the logical processor sets in the VIRR in the current virtual-APIC page each bit corresponding to one that was set in the PID's PIR; 2) the logical processor clears the PID's PIR field; 3) the logical processor clears the PID's ON bit.

In each case (interrupt posting or posted-interrupt processing), the memory accesses to the PID are performed atomically in some embodiments.

In some embodiments, a bit in a VM-execution controls register may be used to define IPI virtualization. For example, in some embodiments, bit 4 of the tertiary processor-based VM-execution controls is defined to be IPI virtualization.

In embodiments, when the "IPI virtualization" VM-execution control is 1, the processor uses a data structure called the PID-pointer table. Each entry in the PID-pointer table contains the 64-bit physical address of a PID, as defined above. In embodiments, each such address is 64-byte aligned, bit 0 is valid bit, and bits 5:1 are reserved and fixed to be 0.

A PID-pointer table may have up to $2^{16}-1$ entries. The processor indexes into a PID-pointer table using a virtual APIC ID. VMM software configures a virtual processor's PID-pointer table using the following new VM-execution control fields in the virtual processor's VMCS: 1) PID-pointer table address, e.g., a 64-bit physical address of a PID-pointer table (if the "IPI virtualization" VM-execution control is 1, the logical processor uses entries in this table to virtualize IPIs; in embodiments, the encodings for this field are 00002042H (all 64 bits in 64-bit mode; low 32 bits in legacy mode) and 00002043H (high 32 bits); 2) last PID-pointer index, e.g., a 16-bit field with encoding 00000008H (this field contains the index of the last entry in the PID-pointer table). In embodiments, these fields do not exist on processors that do not support the 1-setting of the "IPI virtualization" VM-execution control.

In some embodiments, there are changes to VM entries. For example, if the "activate tertiary controls" and "IPI virtualization" VM-execution controls are both 1, VM entries ensure the following: the "use TPR shadow" VM-execution control is 1; bits 2:0 of the PID-pointer table address are 0; the PID-pointer table address does not set any bits beyond the processor's physical-address width; and/or the address of the last entry in the PID-pointer table does not set any bits beyond the processor's physical-address width (e.g., this address is the PID-pointer table address plus eight times the last PID-pointer index).

VM entry fails if any of these checks fail. When such a failure occurs, control is passed to the next instruction, RFLAGS.ZF is set to 1 to indicate the failure, and the VM-instruction error field is loaded to indicate "VM entry with invalid control field(s)" (e.g., value 7).

These checks may be performed in any order with respect to other checks on VMX controls and the host-state area. Different processors may thus give different error numbers for the same VMCS.

In some embodiments, there are existing VM-execution controls that enable the APIC virtualization. "IPI virtualization" is another such control. When it is 1, the processor emulates writes to APIC registers that would send IPIs. Specifically, it changes the treatment of writes to offset 300H on the APIC-access page, executions of the WRMSR instruction with ECX=830H, and some executions of a SENDUIPI instruction.

For Virtualizing Memory-Mapped Writes to ICR_LO, if the "virtualize APIC accesses" VM-execution control is 1, the processor recognizes writes to offset 300H (interrupt command—low) of the APIC-access page, causing the data to be written to that offset on the virtual APIC page (VI-CR_LO), if any of the following VM-execution controls are 1: "virtual-interrupt delivery," "APIC-register virtualization," or "IPI virtualization." If all of these controls are 0, writes to offset 300H of the APIC-access page cause APIC-access VM exits.

Following the write, the processor performs APIC-write emulation, depending up on setting of the VM-execution controls and the value that was written to VICR_LO: 1) if "virtual-interrupt delivery" is 1 and VICR_LO indicates a self-IPI, the processor performs self-IPI virtualization; 2) if "IPI virtualization" is 1, the processor checks the value of VICR_LO to determine whether the following are all true: reserved bits (31:20, 17:16, 13) and bit 12 (delivery status) are all 0, bits 19:18 (destination shorthand) are 00B (no shorthand), bit 15 (trigger mode) is 0 (edge), bit 11 (destination mode) is 0 (physical), bits 10:8 (delivery mode) are 000B (fixed)—if all of the items above are true, the processor performs IPI virtualization using the 8-bit vector in byte 0 of VICR_LO and the APIC ID in VICR_HI[31:24] (VI-CR_HI is offset 310H on the virtual-APIC page).

If neither #1 nor #2 applies (either because the identified control is 0 or the VICR_LO value does not satisfy the conditions indicated for those steps), an APIC-write VM exit occurs. The basic exit reason for an APIC-write VM exit is "APIC write" and the exit qualification is the page offset of the write that led to the VM exit (300H in this case).

If the "virtualize x2APIC mode" VM-execution control is 1, the processor virtualizes execution of the WRMSR instruction when ECX indicates certain x2APIC MSRs (those in the range 800H-8FFH).

If the "IPI virtualization" VM-execution control is also 1, new behavior applies to those executions of WRMSR with ECX=830H (ICR) that do not fault (e.g., because CPL>0) or cause a VM exit (e.g., due to the MSR bitmaps): 1) no general-protection exception (#GP) is produced due to the fact that the local APIC is in xAPIC mode; 2) normal reserved bit checking applies: a #GP occurs if any of bits 31:20, 17:16, or 13 of EAX is non-zero; 3) if there is no fault, WRMSR stores EDX:EAX at offset 300H on the virtual-APIC page (VICR), then, the processor checks the value of VICR to determine whether the following are all true: bits 19:18 (destination shorthand) are 00B (no shorthand), bit 15 (trigger mode) is 0 (edge), bit 12 (unused) is 0, bit 11 (destination mode) is 0 (physical), bits 10:8 (delivery mode) are 000B (fixed); if the items above are true, the processor performs IPI virtualization using the 8-bit vector in byte 0 of VICR and the APIC ID in VICR[63:32]. Otherwise, the logical processor causes an APIC-write VM exit; the basic exit reason is "APIC write" and the exit qualification is 300H.

The user-interrupt feature may use an instruction, SENDUIPI, that software operating with current privilege level (CPL) of 3 can use to send user interrupts to another software thread ("user IPIs"). FIG. 3 illustrates embodiments of the SENDUIPI instruction format, operation, etc. The SENDUIPI instruction has the following high-level operation: 1) read selected entry from user-interrupt target table; 2) use address in entry to read the referenced user posted-interrupt descriptor (UPID); 3) update certain fields in UPID; 4) if necessary, send ordinary IPI indicated in UPID's notification information.

The fourth action uses two fields in the UPID: an 8-bit notification vector (UPID.NV) and a 32-bit notification destination (an APIC ID, UPID.NDST). Outside of VMX non-root operation, the processor implements the action as follows: 1) if the local APIC is in xAPIC mode, it writes UPID.NDST[15:8] to ICR_HI[31:24] (offset 310H from IA32_APIC_BASE) and then writes UPID.NV to ICR_LO (offset 300H); 2) if the local APIC is in x2APIC mode, it performs the control-register write that would be done by an execution of WRMSR with ECX=830H (ICR), EAX=UPID.NV, and EDX=UPID.NDST.

In VMX non-root operation, embodiments of the action depend on the settings of the "use TPR shadow," "virtualize APIC accesses," and "IPI virtualization" VM-execution controls:

1) If the "use TPR shadow" VM-execution control is 0, the behavior is not modified: the logical processor sends the specified IPI by writing to the local APIC's ICR as specified above (based on the current mode of the local APIC).

2) If the "use TPR shadow" VM-execution control is 1 and the "virtualize APIC accesses" VM-execution control is 0, the logical processor virtualizes the sending of an x2APIC-mode IPI with the following steps:

A) The 64-bit value Z is written to offset 300H on the virtual-APIC page (VICR), where Z[7:0]=UPID.NV (the 8-bit virtual vector), Z[63:32]=UPID.NDST (the 32-bit virtual APIC ID) and Z[31:8]=000000H (indicating a physically addressed fixed-mode IPI).

B) If the "IPI virtualization" VM-execution control is 1, IPI virtualization (Section 6.4) is performed using the vector UPID.NV and the APIC ID UPID.NDST.

C) If the "IPI virtualization" VM-execution control is 0, an APIC-write VM exit occurs. The basic exit reason is "APIC write" and the exit qualification is 300H. APIC-write VM exits are trap-like: the value of CS:RIP saved in the guest-state area of the VMCS references the instruction after SENDUIPI.

3) If the "use TPR shadow" and "virtualize APIC accesses" VM-execution controls are both 1, al processor virtualizes the sending of an xAPIC-mode IPI by performing the following steps:

A) The 32-bit value X is written to offset 310H on the virtual-APIC page (VICR_HI), where X[31:24]=UPID.NDST[15:8] (the 8-bit virtual APIC ID) and X[23:0]=000000H.

B) The 32-bit value Y is written to offset 300H on the virtual-APIC page (VICR_LO), where Y[7:0]=UPID.NV (the 8-bit virtual vector) and Y[31:8]=000000H (indicating a physically addressed fixed-mode IPI).

C) If the "IPI virtualization" VM-execution control is 1, IPI virtualization is performed using the vector UPID.NV and the APIC ID UPID.NDST[15:8].

D) If the "IPI virtualization" VM-execution control is 0, an APIC-write VM exit occurs as in case 2C above.

If the "IPI virtualization" VM-execution control is 1, the processor performs IPI virtualization in response to the following operations: 1) virtualization of a write to offset 300H on the APIC-access page; 2) virtualization of the WRMSR instruction with ECX=830H; and virtualization of some executions of SENDUIPI.

Each operation that leads to IPI virtualization provides an 8-bit virtual vector V and a 32-bit virtual APIC ID T. IPI virtualization uses the values to initiate the indicated virtual IPI using the PID-pointer table, as illustrated, for example, by the following pseudocode:

```
IF V < 16
    THEN APIC-write VM exit;   // illegal vector
ELSE IF T <= last PID-pointer index
    THEN
        PID_ADDR <- 8 bytes at (PID-pointer table address + (T << 3));
        IF PID_ADDR sets bits beyond the processor's physical-address
        width OR
            PID_ADDR[5:0] != 000001b // PID pointer not valid
            or reserved bits set
        THEN APIC-write VM exit;
        ELSE
            PIR <- 32 bytes at PID_ADDR; // with lock; could read just
            portion with bit V
            PIR[V] <- 1;
            store PIR at PID_ADDR;   // unlock
            NotifyInfo <- 8 bytes at PID_ADDR + 32; // with lock
            IF NotifyInfo.ON = 0 AND NotifyInfo.SN = 0
                THEN
                    NotifyInfo.ON <- 1;
                    SendNotify <- 1;
                ELSE SendNotify <- 0;
            FI;
            store NotifyInfo at PID_ADDR + 32; // unlock
            IF SendNotify = 1
                THEN send an IPI specified by NotifyInfo.NDST and
                NotifyInfo.NV;
            FI;
    FI;
    ELSE APIC-write VM exit // virtual APIC ID beyond end of tables
FI;
```

The sending of the notification IPI is indicated by fields in the selected PID: NDST (PID[319:288]) and NV (PID[279:272]): 1) if the local APIC is in xAPIC mode, this is the IPI that would be generated by writing NDST[15:8] (PID[303:296]) to ICR_HI[31:24] (offset 310H from IA32_APIC_BASE) and then writing NV to ICR_LO (offset 300H from IA32_APIC_BASE); 2) if the local APIC is in x2APIC mode, this is the IPI that would be generated by executing WRMSR with ECX=830H (ICR), EAX=NV, and EDX=NDST.

If the pseudocode specifies an APIC-write, the basic exit reason is "APIC write" and the exit qualification is 300H.

In some embodiments, the IPI virtualization feature affects only memory-mapped writes to ICR_LO, WRMSR to the ICR MSR, and SENDUIPI. The following items discuss the virtualization of other API accesses related to IPIs:

If the "virtualize APIC accesses" VM-execution control is 1, the processor recognizes writes to offset 310H (interrupt command—high) of the APIC-access page. If the "APIC-register virtualization" VM-execution control is also 1, the data is written to that offset on the virtual APIC page (VICR_HI); no VM exit or other emulation occurs. If "APIC-register virtualization" is 0, writes to offset 310H of the APIC-access page cause APIC-access VM exits. The setting of the "IPI virtualization" VM-execution control has no effect on these writes.

If the "virtualize APIC accesses" VM-execution control is 1, the processor recognizes reads from offset 300H (interrupt command—low) of the APIC-access page. If either the "APIC-register virtualization" VM-execution control or the "virtual-interrupt delivery" VM-execution control is also 1, data is read from that offset on the virtual APIC page (VICR_LO). If both those controls are 0, reads from offset 300H of the APIC-access page cause APIC-access VM exits. The setting of the "IPI virtualization" VM-execution control has no effect on these reads.

If the "virtualize APIC accesses" VM-execution control is 1, the processor recognizes reads from offset 310H of the APIC-access page. If the "APIC-register virtualization" VM-execution control is also 1, data is read from VICR_HI. If "APIC-register virtualization" is 0, reads from offset 310H of the APIC-access page cause APIC-access VM exits. The setting of the "IPI virtualization" VM-execution control has no effect on these reads.

If the "virtualize x2APIC mode" VM-execution control is 1, the processor recognizes RDMSR from MSR 830H (ICR). If the "APIC-register virtualization" VM-execution control is also 1, data is read from offset 300H on the virtual-APIC page (VICR). If "APIC-register virtualization" is 0, RDMSR from MSR 830H operates normally. The setting of the "IPI virtualization" VM-execution control has no effect on RDMSR.

In some embodiments, a bit of the tertiary processor-based VM-execution controls is defined to be "IPI virtualization" (e.g., bit 4). A processor that supports the 1-setting of "IPI virtualization" sets bit 4 of the IA32_VMX_PROCBASED_CTLS3 MSR (index 492H): RDMSR of that MSR returns 1 in bit 4 of EAX. Enumeration of the 1-setting also implies support for the VMCS fields PID-pointer table address and last PID-pointer index.

Example Embodiments

In an embodiment, an apparatus includes a plurality of processor cores; an interrupt controller register; and logic to, in response to a write from a virtual machine to the interrupt controller register, record an interprocessor interrupt in a first data structure configured by a virtual machine monitor and send a notification of the interprocessor interrupt to at least one of the plurality of processor cores.

Any such embodiments may include any or any combination of the following aspects. The logic is to record the interprocessor interrupt and send the notification from within the virtual machine. The at least one of the plurality of processor cores is a processor core on which the virtual machine executes. The logic is to reference a second data structure to check that the at least one of the plurality of processor cores is a valid destination, the second data structure to be configured with interrupt controller identifiers corresponding to processor cores in a same subset of processor cores as the processor core on which the virtual machine executes. The interrupt controller register has a first field to indicate a destination of the interprocessor interrupt. The interrupt controller register has a second field to indicate whether to send the interprocessor interrupt only to the destination indicated in the first field, only to the core on which the virtual machine executes, to all of the subset of processor cores including the core on which the virtual machine executes, or to all of the subset of processor cores excluding the core on which the virtual machine executes. The interrupt controller register is to be accessed by software through memory accesses to a specified address. The interrupt controller register is to be accessed by software through a write instruction to a different register. The interrupt controller register has a second field to indicate an interrupt vector. The interrupt controller register has a second field to indicate a destination mode. The interrupt controller register has a second field to indicate a delivery status. The interprocessor interrupt is a user-level interrupt.

In embodiments, a method includes configuring, by a virtual machine monitor, a first data structure to record interprocessor interrupts; configuring an interrupt controller register to send an interprocessor interrupt from a virtual machine; writing, by software running on the virtual machine, to an interrupt controller register; recording, in response to writing, the interprocessor interrupt in the first data structure; sending, in response to writing, a notification of the interprocessor interrupt to at least one of a plurality of processor cores.

Any such embodiments may include any or any combination of the following aspects. Recording and sending is performed from within the virtual machine. The at least one of the plurality of processor cores is a processor core on which the virtual machine executes. The logic is to reference a second data structure to check that the at least one of the plurality of processor cores is a valid destination, the second data structure to be configured with interrupt controller identifiers corresponding to processor cores in a same subset of processor cores as the processor core on which the virtual machine executes. The software is to access the interrupt controller register through memory accesses to a specified address. The software is to access the interrupt controller register through a write instruction to a different register.

In embodiments, a system includes a system bus; a plurality of processors coupled to the system bus, at least one of the processors having a plurality of cores; a local interrupt controller corresponding to one of the processor cores, including: an interrupt controller register; and logic to, in response to a write from a virtual machine to the interrupt controller register, record an interprocessor interrupt in a first data structure configured by a virtual machine monitor and send a notification of the interprocessor interrupt to at least one of the plurality of processor cores.

Any such embodiments may include any or any combination of the following aspects. The system of claim also includes an input/output interrupt controller coupled to the system bus. The logic is to record the interprocessor interrupt and send the notification from within the virtual machine. The at least one of the plurality of processor cores is a processor core on which the virtual machine executes. The logic is to reference a second data structure to check that the at least one of the plurality of processor cores is a valid destination, the second data structure to be configured with interrupt controller identifiers corresponding to processor cores in a same subset of processor cores as the processor core on which the virtual machine executes. The interrupt controller register has a first field to indicate a destination of the interprocessor interrupt. The interrupt controller register has a second field to indicate whether to send the interprocessor interrupt only to the destination indicated in the first field, only to the core on which the virtual machine executes, to all of the subset of processor cores including the core on which the virtual machine executes, or to all of the subset of processor cores excluding the core on which the virtual machine executes. The interrupt controller register is to be accessed by software through memory accesses to a specified address. The interrupt controller register is to be accessed by software through a write instruction to a different register. The interrupt controller register has a second field to indicate an interrupt vector. The interrupt controller register has a second field to indicate a destination mode. The interrupt controller register has a second field to indicate a delivery status. The interprocessor interrupt is a user-level interrupt.

In embodiments, an apparatus may include means for performing any function disclosed herein. In embodiments, an apparatus may include a data storage device that stores code that when executed by a hardware processor causes the hardware processor to perform any method disclosed herein. In embodiments, an apparatus may be as described in the detailed description. In embodiments, a method may be as described in the detailed description. In embodiments, a non-transitory machine-readable medium may store instructions that when executed by a machine causes the machine to perform a method including any method disclosed herein. Embodiments may include any details, features, etc. or combinations of details, features, etc. described in this specification.

Example Computer Architectures

Detailed below are describes of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 4:
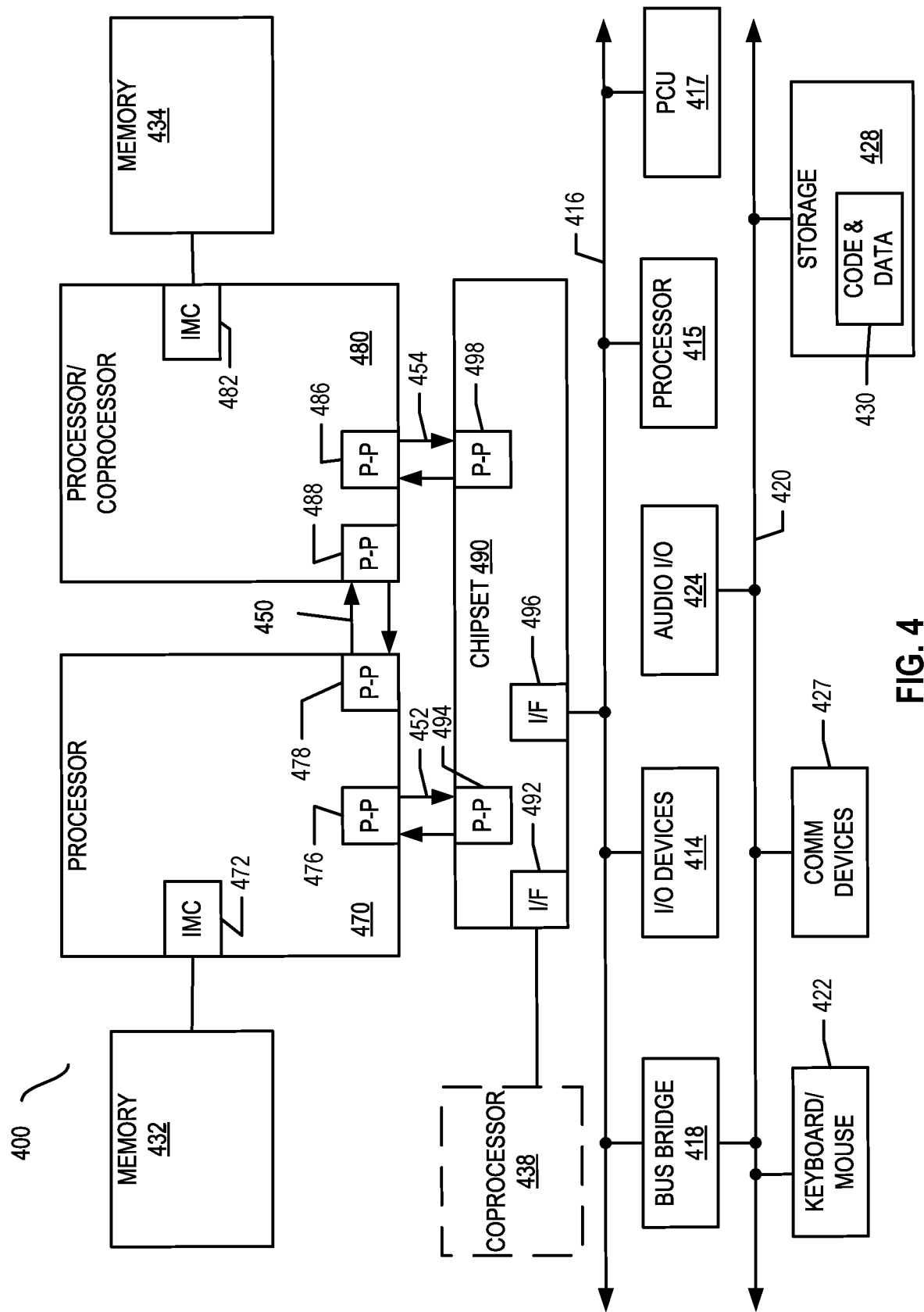
FIG. 4 illustrates an example system according to embodiments.

FIG. 4 illustrates embodiments of an example system. Multiprocessor system 400 is a point-to-point interconnect system and includes a plurality of processors including a first processor 470 and a second processor 480 coupled via a point-to-point interconnect 450. In some embodiments, the first processor 470 and the second processor 480 are homogeneous. In some embodiments, first processor 470 and the second processor 480 are heterogenous.

Processors 470 and 480 are shown including integrated memory controller (IMC) units circuitry 472 and 482, respectively. Processor 470 also includes as part of its interconnect controller units' point-to-point (P-P) interfaces 476 and 478; similarly, second processor 480 includes P-P interfaces 486 and 488. Processors 470, 480 may exchange information via the point-to-point (P-P) interconnect 450 using P-P interface circuits 478, 488. IMCs 472 and 482 couple the processors 470, 480 to respective memories, namely a memory 432 and a memory 434, which may be portions of main memory locally attached to the respective processors.

Processors 470, 480 may each exchange information with a chipset 490 via individual P-P interconnects 452, 454 using point to point interface circuits 476, 494, 486, 498. Chipset 490 may optionally exchange information with a coprocessor 438 via a high-performance interface 492. In some embodiments, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor 470, 480 or outside of both processors, yet connected with the processors via P-P interconnect, such that either or both processors' local cache information may be stored in the shared cache if a processor is placed into a low power mode.

Chipset 490 may be coupled to a first interconnect 416 via an interface 496. In some embodiments, first interconnect 416 may be a Peripheral Component Interconnect (PCI) interconnect, or an interconnect such as a PCI Express interconnect or another I/O interconnect. In some embodiments, one of the interconnects couples to a power control unit (PCU) 417, which may include circuitry, software, and/or firmware to perform power management operations with regard to the processors 470, 480 and/or co-processor 438. PCU 417 provides control information to a voltage regulator to cause the voltage regulator to generate the appropriate regulated voltage. PCU 417 also provides control information to control the operating voltage generated.

In various embodiments, PCU 417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 417 is illustrated as being present as logic separate from the processor 470 and/or processor 480. In other cases, PCU 417 may execute on a given one or more of cores (not shown) of processor 470 or 480. In some cases, PCU 417 may be implemented as a microcontroller (dedicated or general-purpose) or other control logic configured to execute its own dedicated power management code, sometimes referred to as P-code. In yet other embodiments, power management operations to be performed by PCU 417 may be implemented externally to a processor, such as by way of a separate power management integrated circuit (PMIC) or another component external to the processor. In yet other embodiments, power management operations to be performed by PCU 417 may be implemented within BIOS or other system software.

Various I/O devices 414 may be coupled to first interconnect 416, along with an interconnect (bus) bridge 418 which couples first interconnect 416 to a second interconnect 420. In some embodiments, one or more additional processor(s) 415, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 416. In some embodiments, second interconnect 420 may be a low pin count (LPC) interconnect. Various devices may be coupled to second interconnect 420 including, for example, a keyboard and/or mouse 422, communication devices 427 and a storage unit circuitry 428. Storage unit circuitry 428 may be a disk drive or other mass storage device which may include instructions/code and data 430, in some embodiments. Further, an audio I/O 424 may be coupled to second interconnect 420. Note that other architectures than the point-to-point architecture described above are possible. For example, instead of the point-to-point architecture, a system such as multiprocessor system 400 may implement a multi-drop interconnect or other such architecture.

Example Core Architectures, Processors, and Computer Architectures

Processor cores may be implemented in different ways, for different purposes, and in different processors. For instance, embodiments of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Embodiments of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Example core architectures are described next, followed by descriptions of example processors and computer architectures.

Figure 5:
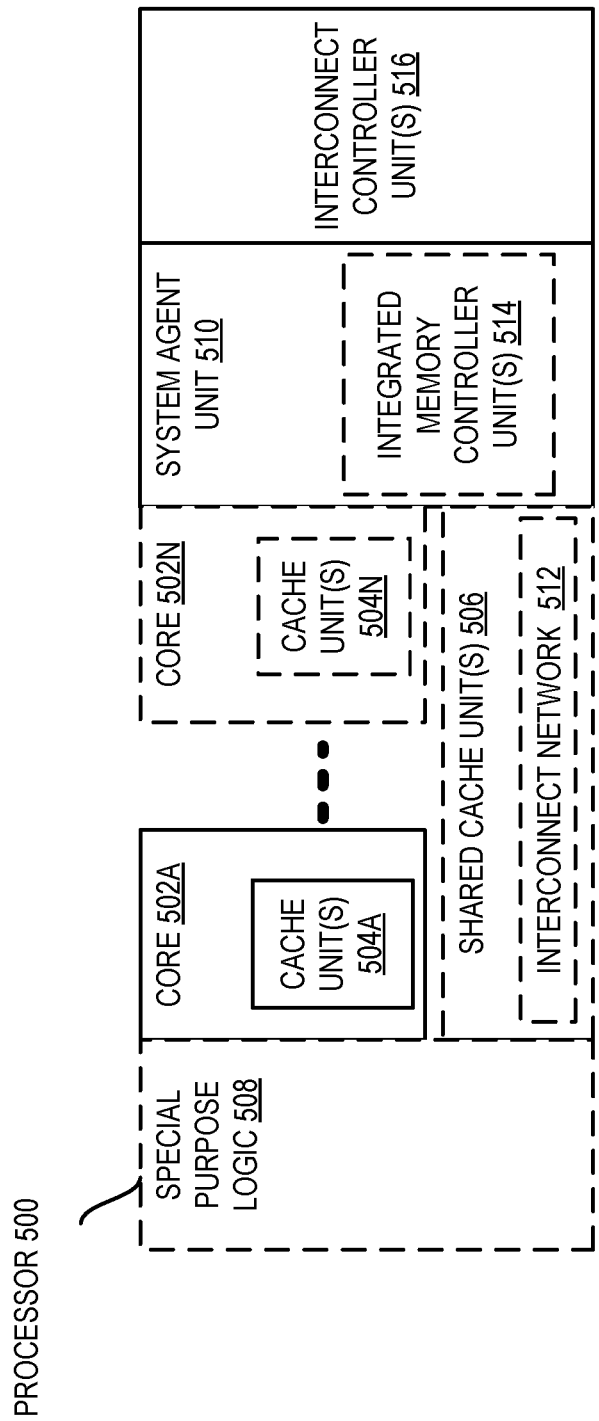
FIG. 5 illustrates a block diagram of a processor according to embodiments.

FIG. 5 illustrates a block diagram of embodiments of a processor 500 that may have more than one core, may have an integrated memory controller, and may have integrated graphics. The solid lined boxes illustrate a processor 500 with a single core 502A, a system agent 510, a set of one or more interconnect controller units circuitry 516, while the optional addition of the dashed lined boxes illustrates an alternative processor 500 with multiple cores 502(A)-(N), a set of one or more integrated memory controller unit(s) circuitry 514 in the system agent unit circuitry 510, and special purpose logic 508, as well as a set of one or more interconnect controller units circuitry 516. Note that the processor 500 may be one of the processors 470 or 480, or co-processor 438 or 415 of FIG. 4.

Thus, different embodiments of the processor 500 may include: 1) a CPU with the special purpose logic 508 being integrated graphics and/or scientific (throughput) logic (which may include one or more cores, not shown), and the cores 502(A)-(N) being one or more general purpose cores (e.g., general purpose in-order cores, general purpose out-of-order cores, or a combination of the two); 2) a coprocessor with the cores 502(A)-(N) being a large number of special purpose cores intended primarily for graphics and/or scientific (throughput); and 3) a coprocessor with the cores 502(A)-(N) being a large number of general purpose in-order cores. Thus, the processor 500 may be a general-purpose processor, coprocessor, or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

A memory hierarchy includes one or more levels of cache unit(s) circuitry 504(A)-(N) within the cores 502(A)-(N), a set of one or more shared cache units circuitry 506, and external memory (not shown) coupled to the set of integrated memory controller units circuitry 514. The set of one or more shared cache units circuitry 506 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 512 interconnects the special purpose logic 508 (e.g., integrated graphics logic), the set of shared cache units circuitry 506, and the system agent unit circuitry 510, alternative embodiments use any number of well-known techniques for interconnecting such units. In some embodiments, coherency is maintained between one or more of the shared cache units circuitry 506 and cores 502(A)-(N).

In some embodiments, one or more of the cores 502(A)-(N) are capable of multi-threading. The system agent unit circuitry 510 includes those components coordinating and operating cores 502(A)-(N). The system agent unit circuitry 510 may include, for example, power control unit (PCU) circuitry and/or display unit circuitry (not shown). The PCU may be or may include logic and components needed for regulating the power state of the cores 502(A)-(N) and/or the special purpose logic 508 (e.g., integrated graphics logic). The display unit circuitry is for driving one or more externally connected displays.

The cores 502(A)-(N) may be homogenous or heterogeneous in terms of architecture instruction set; that is, two or more of the cores 502(A)-(N) may be capable of executing the same instruction set, while other cores may be capable of executing only a subset of that instruction set or a different instruction set.

Example Core Architectures

In-Order and Out-of-Order Core Block Diagram

Figure 6A:
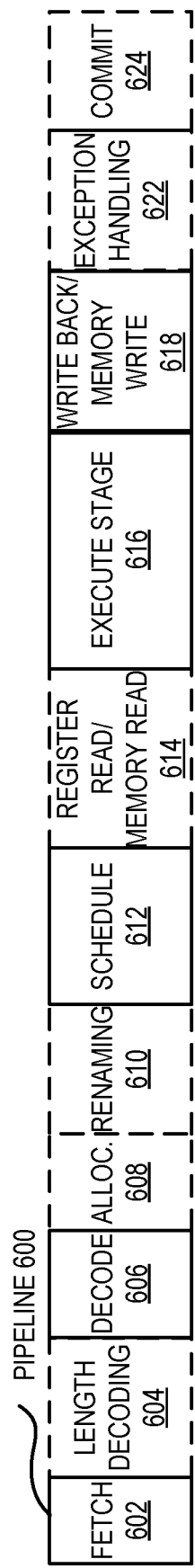
FIG. 6(A) is a block diagram illustrating both an example in-order pipeline and an example register renaming, out-of-order issue/execution pipeline according to embodiments.
Figure 6B:
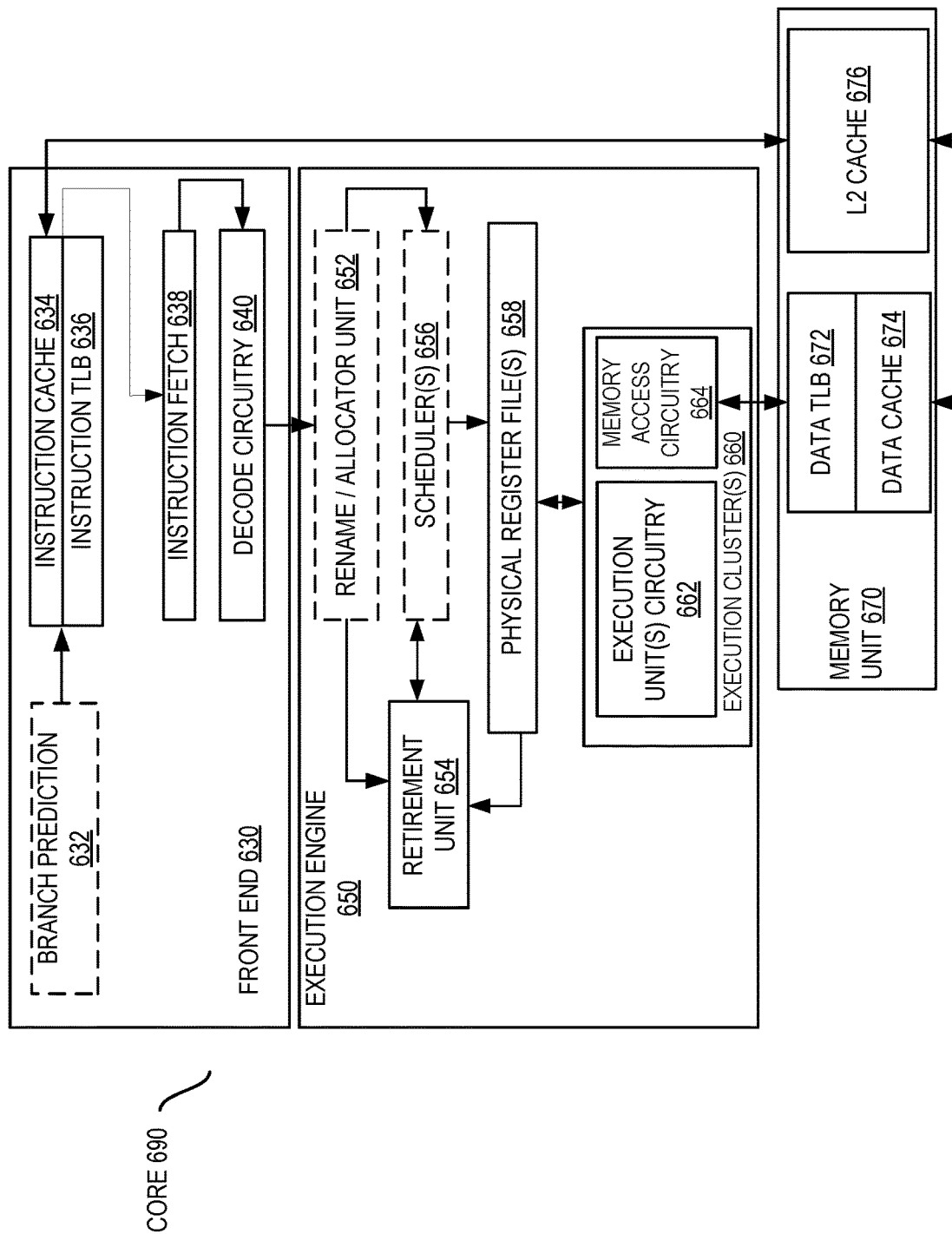
FIG. 6(B) is a block diagram illustrating both an example embodiment of an in-order architecture core and an example register renaming, out-of-order issue/execution architecture core to be included in a processor according to embodiments.

FIG. 6(A) is a block diagram illustrating both an example in-order pipeline and an example register renaming, out-of-order issue/execution pipeline according to embodiments of the invention. FIG. 6(B) is a block diagram illustrating both an example embodiment of an in-order architecture core and an example register renaming, out-of-order issue/execution architecture core to be included in a processor according to embodiments of the invention. The solid lined boxes in FIGS. 6(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6(A), a processor pipeline 600 includes a fetch stage 602, an optional length decode stage 604, a decode stage 606, an optional allocation stage 608, an optional renaming stage 610, a scheduling (also known as a dispatch or issue) stage 612, an optional register read/memory read stage 614, an execute stage 616, a write back/memory write stage 618, an optional exception handling stage 622, and an optional commit stage 624. One or more operations can be performed in each of these processor pipeline stages. For example, during the fetch stage 602, one or more instructions are fetched from instruction memory, during the decode stage 606, the one or more fetched instructions may be decoded, addresses (e.g., load store unit (LSU) addresses) using forwarded register ports may be generated, and branch forwarding (e.g., immediate offset or a link register (LR)) may be performed. In some embodiments, the decode stage 606 and the register read/memory read stage 614 may be combined into one pipeline stage. In some embodiments, during the execute stage 616, the decoded instructions may be executed, LSU address/data pipelining to an Advanced Microcontroller Bus (AHB) interface may be performed, multiply and add operations may be performed, arithmetic operations with branch results may be performed, etc.

By way of example, the example register renaming, out-of-order issue/execution core architecture may implement the pipeline 600 as follows: 1) the instruction fetch 638 performs the fetch and length decoding stages 602 and 604; 2) the decode unit circuitry 640 performs the decode stage 606; 3) the rename/allocator unit circuitry 652 performs the allocation stage 608 and renaming stage 610; 4) the scheduler unit(s) circuitry 656 performs the schedule stage 612; 5) the physical register file(s) unit(s) circuitry 658 and the memory unit circuitry 670 perform the register read/memory read stage 614; the execution cluster 660 perform the execute stage 616; 6) the memory unit circuitry 670 and the physical register file(s) unit(s) circuitry 658 perform the write back/memory write stage 618; 7) various units (unit circuitry) may be involved in the exception handling stage 622; and 8) the retirement unit circuitry 654 and the physical register file(s) unit(s) circuitry 658 perform the commit stage 624.

FIG. 6(B) shows processor core 690 including front-end unit circuitry 630 coupled to an execution engine unit circuitry 650, and both are coupled to a memory unit circuitry 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front-end unit circuitry 630 may include branch prediction unit circuitry 632 coupled to an instruction cache unit circuitry 634, which is coupled to an instruction translation lookaside buffer (TLB) 636, which is coupled to instruction fetch unit circuitry 638, which is coupled to decode unit circuitry 640. In some embodiments, the instruction cache unit circuitry 634 is included in the memory unit circuitry 670 rather than the front-end unit circuitry 630. The decode unit circuitry 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 640 may further include an address generation unit circuitry (AGU, not shown). In some embodiments, the AGU generates an LSU address using forwarded register ports, and may further perform branch forwarding (e.g., immediate offset branch forwarding, LR register branch forwarding, etc.). The decode unit circuitry 640 may be implemented using various different mechanisms. Examples of suitable mechanisms include, but are not limited to, look-up tables, hardware embodiments, programmable logic arrays (PLAs), microcode read only memories (ROMs), etc. In some embodiments, the core 690 includes a microcode ROM (not shown) or other medium that stores microcode for certain macroinstructions (e.g., in decode unit circuitry 640 or otherwise within the front-end unit circuitry 630). In some embodiments, the decode unit circuitry 640 includes a micro-operation (micro-op) or operation cache (not shown) to hold/cache decoded operations, micro-tags, or micro-operations generated during the decode or other stages of the processor pipeline 600. The decode unit circuitry 640 may be coupled to rename/allocator unit circuitry 652 in the execution engine unit circuitry 650.

The execution engine circuitry 650 includes the rename/allocator unit circuitry 652 coupled to a retirement unit circuitry 654 and a set of one or more scheduler(s) circuitry 656. The scheduler(s) circuitry 656 represents any number of different schedulers, including reservations stations, central instruction window, etc. In some embodiments, the scheduler(s) circuitry 656 can include arithmetic logic unit (ALU) scheduler/scheduling circuitry, ALU queues, arithmetic generation unit (AGU) scheduler/scheduling circuitry, AGU queues, etc. The scheduler(s) circuitry 656 is coupled to the physical register file(s) circuitry 658. Each of the physical register file(s) circuitry 658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In some embodiments, the physical register file(s) unit circuitry 658 includes vector registers unit circuitry, writemask registers unit circuitry, and scalar register unit circuitry. These register units may provide architectural vector registers, vector mask registers, general-purpose registers, etc. The physical register file(s) unit(s) circuitry 658 is overlapped by the retirement unit circuitry 654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 654 and the physical register file(s) circuitry 658 are coupled to the execution cluster(s) 660. The execution cluster(s) 660 includes a set of one or more execution units circuitry 662 and a set of one or more memory access circuitry 664. The execution units circuitry 662 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 656, physical register file(s) unit(s) circuitry 658, and execution cluster(s) 660 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 664). It should also be understood that where separate pipelines are used, one or more of these pipelines may be out-of-order issue/execution and the rest in-order.

In some embodiments, the execution engine unit circuitry 650 may perform load store unit (LSU) address/data pipelining to an Advanced Microcontroller Bus (AHB) interface (not shown), and address phase and writeback, data phase load, store, and branches.

The set of memory access circuitry 664 is coupled to the memory unit circuitry 670, which includes data TLB unit circuitry 672 coupled to a data cache circuitry 674 coupled to a level 2 (L2) cache circuitry 676. In one example embodiment, the memory access units circuitry 664 may include a load unit circuitry, a store address unit circuit, and a store data unit circuitry, each of which is coupled to the data TLB circuitry 672 in the memory unit circuitry 670. The instruction cache circuitry 634 is further coupled to a level 2 (L2) cache unit circuitry 676 in the memory unit circuitry 670. In some embodiments, the instruction cache 634 and the data cache 674 are combined into a single instruction and data cache (not shown) in L2 cache unit circuitry 676, a level 3 (L3) cache unit circuitry (not shown), and/or main memory. The L2 cache unit circuitry 676 is coupled to one or more other levels of cache and eventually to a main memory.

The core 690 may support one or more instructions sets (e.g., the x86 instruction set (with some extensions that have been added with newer versions); the MIPS instruction set; the ARM instruction set (with optional additional extensions such as NEON)), including the instruction(s) described herein. In some embodiments, the core 690 includes logic to support a packed data instruction set extension (e.g., AVX1, AVX2), thereby allowing the operations used by many multimedia applications to be performed using packed data.

Example Execution Unit(s) Circuitry

Figure 7:
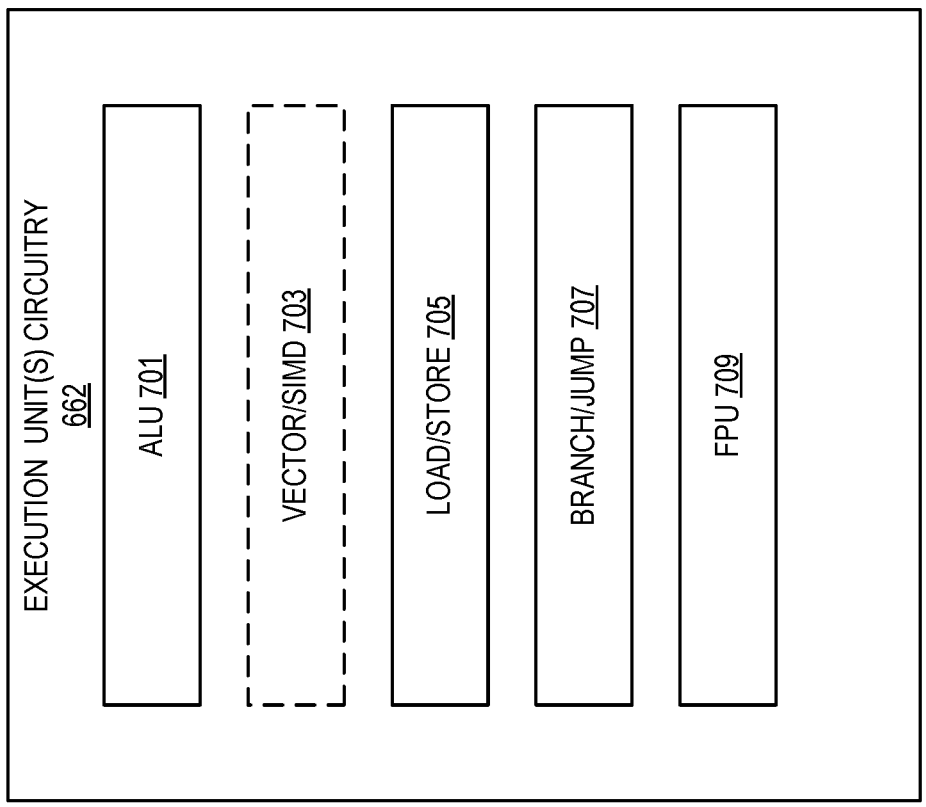
FIG. 7 illustrates execution unit circuitry according to embodiments.

FIG. 7 illustrates embodiments of execution unit(s) circuitry, such as execution unit(s) circuitry 662 of FIG. 6(B). As illustrated, execution unit(s) circuitry 662 may include one or more ALU circuits 701, vector/SIMD unit circuits 703, load/store unit circuits 705, and/or branch/jump unit circuits 707. ALU circuits 701 perform integer arithmetic and/or Boolean operations. Vector/SIMD unit circuits 703 perform vector/SIMD operations on packed data (such as SIMD/vector registers). Load/store unit circuits 705 execute load and store instructions to load data from memory into registers or store from registers to memory. Load/store unit circuits 705 may also generate addresses. Branch/jump unit circuits 707 cause a branch or jump to a memory address depending on the instruction. Floating-point unit (FPU) circuits 709 perform floating-point arithmetic. The width of the execution unit(s) circuitry 662 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Example Register Architecture

Figure 8:
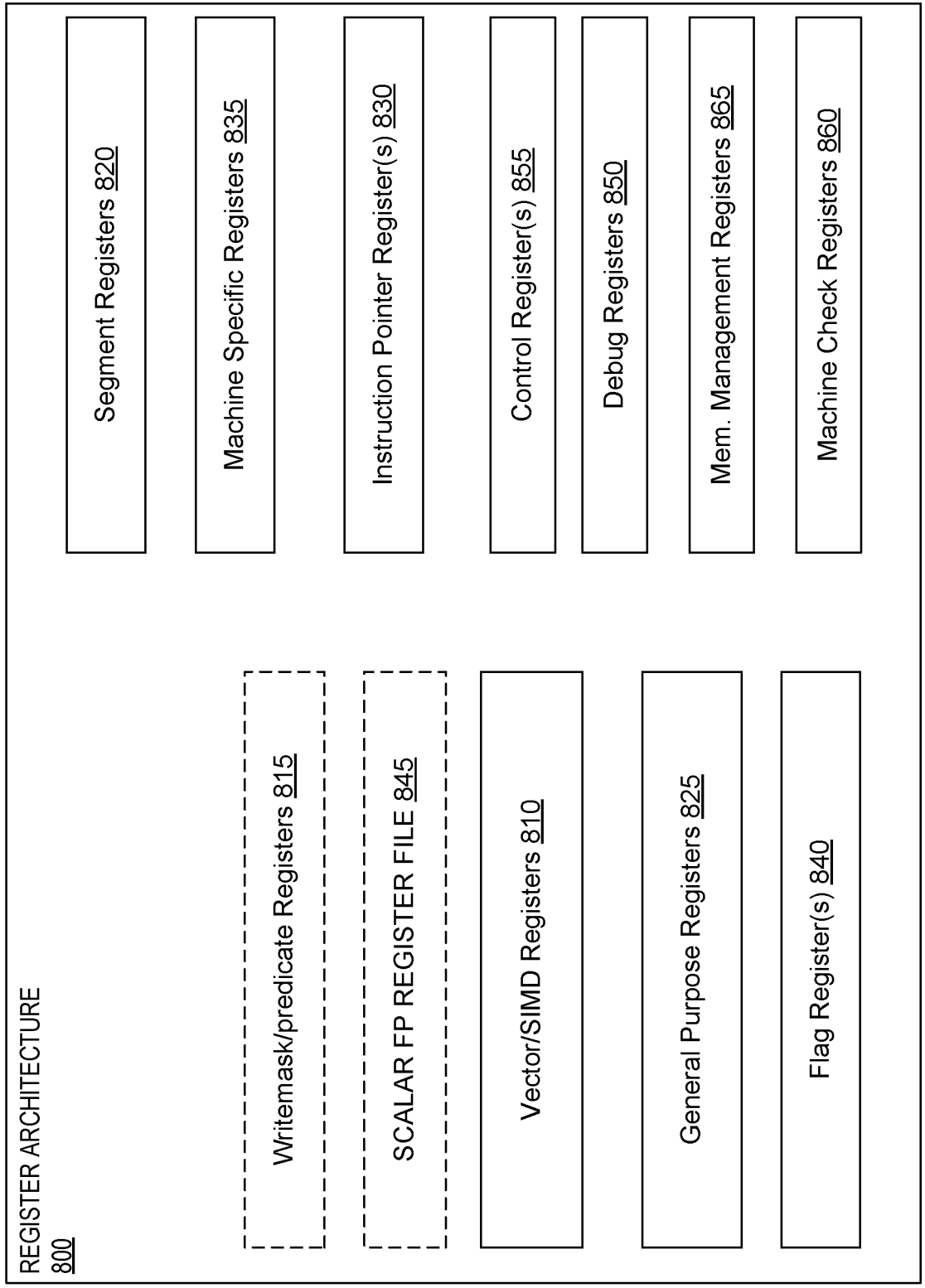
FIG. 8 is a block diagram of a register architecture according to embodiments.

FIG. 8 is a block diagram of a register architecture 800 according to some embodiments. As illustrated, there are vector/SIMD registers 810 that vary from 128-bit to 1,024 bits width. In some embodiments, the vector/SIMD registers 810 are physically 512-bits and, depending upon the mapping, only some of the lower bits are used. For example, in some embodiments, the vector/SIMD registers 810 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 800 includes writemask/predicate registers 815. For example, in some embodiments, there are 8 writemask/predicate registers (sometimes called k0 through k7) that are each 16-bit, 32-bit, 64-bit, or 128-bit in size. Writemask/predicate registers 815 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 815 corresponds to a data element position of the destination. In other embodiments, the writemask/predicate registers 815 are scalable and consists of a set number of enable bits for a given vector element (e.g., 8 enable bits per 64-bit vector element).

The register architecture 800 includes a plurality of general-purpose registers 825. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 800 includes scalar floating-point register 845 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 840 (e.g., EFLAGS, RFLAGS, etc.) store status and control information for arithmetic, compare, and system operations. For example, the one or more flag registers 840 may store condition code information such as carry, parity, auxiliary carry, zero, sign, and overflow. In some embodiments, the one or more flag registers 840 are called program status and control registers.

Segment registers 820 contain segment points for use in accessing memory. In some embodiments, these registers are referenced by the names CS, DS, SS, ES, FS, and GS.

Machine specific registers (MSRs) 835 control and report on processor performance. Most MSRs 835 handle system-related functions and are not accessible to an application program. Machine check registers 860 consist of control, status, and error reporting MSRs that are used to detect and report on hardware errors.

One or more instruction pointer register(s) 830 store an instruction pointer value. Control register(s) 855 (e.g., CR0-CR4) determine the operating mode of a processor (e.g., processor 470, 480, 438, 415, and/or 500) and the characteristics of a currently executing task. Debug registers 850 control and allow for the monitoring of a processor or core's debugging operations.

Memory management registers 865 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Figure 9:
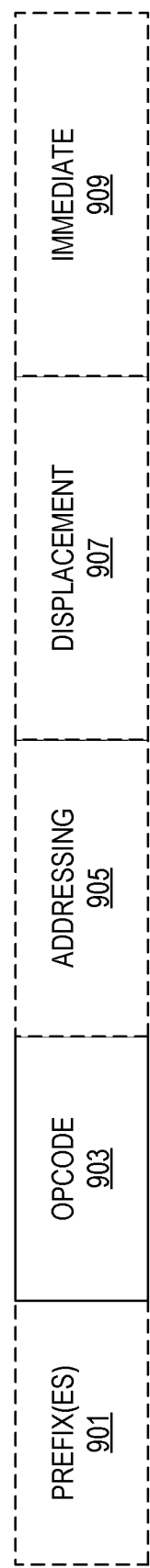
FIG. 9 illustrates an instruction format according to embodiments.

FIG. 9 illustrates embodiments of an instruction format. As illustrated, an instruction may include multiple components including, but not limited to, one or more fields for: one or more prefixes 901, an opcode 903, addressing information 905 (e.g., register identifiers, memory addressing information, etc.), a displacement value 907, and/or an immediate 909. Note that some instructions utilize some or all of the fields of the format whereas others may only use the field for the opcode 903. In some embodiments, the order illustrated is the order in which these fields are to be encoded, however, it should be appreciated that in other embodiments these fields may be encoded in a different order, combined, etc.

The prefix(es) field(s) 901, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 903 is used to at least partially define the operation to be performed upon a decoding of the instruction. In some embodiments, a primary opcode encoded in the opcode field 903 is 1, 2, or 3 bytes in length. In other embodiments, a primary opcode can be a different length. An additional 3-bit opcode field is sometimes encoded in another field.

Figure 10:
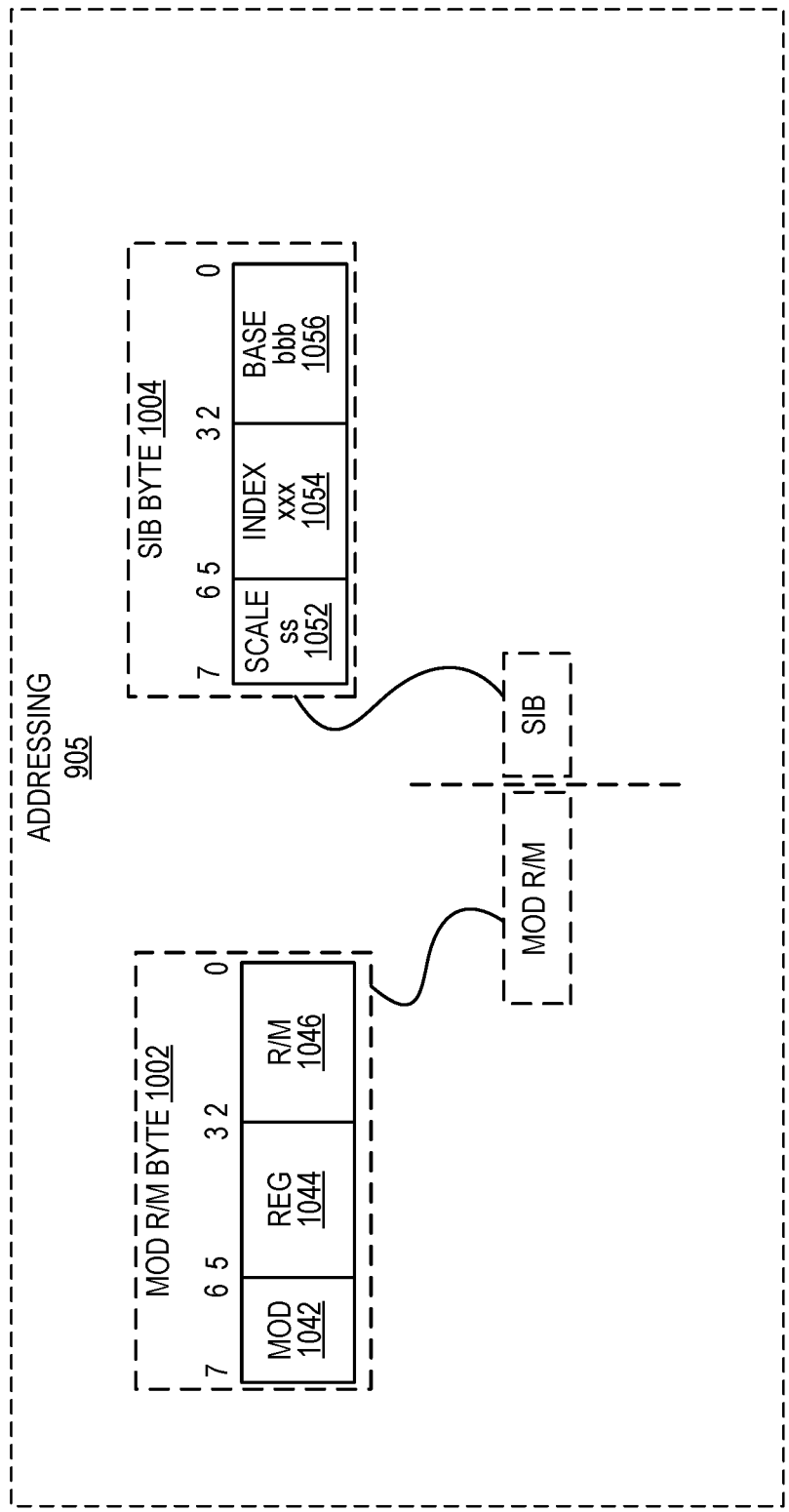
FIG. 10 illustrates an addressing field of an instruction format according to embodiments.

The addressing field 905 is used to address one or more operands of the instruction, such as a location in memory or one or more registers. FIG. 10 illustrates embodiments of the addressing field 905. In this illustration, an optional ModR/M byte 1002 and an optional Scale, Index, Base (SIB) byte 1004 are shown. The ModR/M byte 1002 and the SIB byte 1004 are used to encode up to two operands of an instruction, each of which is a direct register or effective memory address. Note that each of these fields are optional in that not all instructions include one or more of these fields. The MOD R/M byte 1002 includes a MOD field 1042, a register field 1044, and R/M field 1046.

The content of the MOD field 1042 distinguishes between memory access and non-memory access modes. In some embodiments, when the MOD field 1042 has a value of b11, a register-direct addressing mode is utilized, and otherwise register-indirect addressing is used.

The register field 1044 may encode either the destination register operand or a source register operand, or may encode an opcode extension and not be used to encode any instruction operand. The content of register index field 1044, directly or through address generation, specifies the locations of a source or destination operand (either in a register or in memory). In some embodiments, the register field 1044 is supplemented with an additional bit from a prefix (e.g., prefix 901) to allow for greater addressing.

The R/M field 1046 may be used to encode an instruction operand that references a memory address, or may be used to encode either the destination register operand or a source register operand. Note the R/M field 1046 may be combined with the MOD field 1042 to dictate an addressing mode in some embodiments.

The SIB byte 1004 includes a scale field 1052, an index field 1054, and a base field 1056 to be used in the generation of an address. The scale field 1052 indicates scaling factor. The index field 1054 specifies an index register to use. In some embodiments, the index field 1054 is supplemented with an additional bit from a prefix (e.g., prefix 901) to allow for greater addressing. The base field 1056 specifies a base register to use. In some embodiments, the base field 1056 is supplemented with an additional bit from a prefix (e.g., prefix 901) to allow for greater addressing. In practice, the content of the scale field 1052 allows for the scaling of the content of the index field 1054 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 907 provides this value. Additionally, in some embodiments, a displacement factor usage is encoded in the MOD field of the addressing field 905 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 907.

In some embodiments, an immediate field 909 specifies an immediate for the instruction. An immediate may be encoded as a 1-byte value, a 2-byte value, a 4-byte value, etc.

Figure 11:
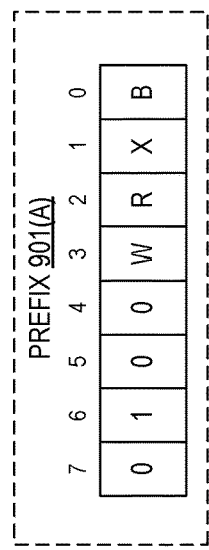
FIG. 11 illustrates a prefix of an instruction format according to embodiments.

FIG. 11 illustrates embodiments of a first prefix 901(A). In some embodiments, the first prefix 901(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 901(A) may specify up to three registers using 3-bit fields depending on the format: 1) using the reg field 1044 and the R/M field 1046 of the Mod R/M byte 1002; 2) using the Mod R/M byte 1002 with the SIB byte 1004 including using the reg field 1044 and the base field 1056 and index field 1054; or 3) using the register field of an opcode.

In the first prefix 901(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1044 and MOD R/M R/M field 1046 alone can each only address 8 registers.

In the first prefix 901(A), bit position 2 (R) may an extension of the MOD R/M reg field 1044 and may be used to modify the ModR/M reg field 1044 when that field encodes a general-purpose register, a 64-bit packed data register (e.g., an SSE register), or a control or debug register. R is ignored when Mod R/M byte 1002 specifies other registers or defines an extended opcode.

Bit position 1 (X) X bit may modify the SIB byte index field 1054.

Bit position B (B) B may modify the base in the Mod R/M R/M field 1046 or the SIB byte base field 1056; or it may modify the opcode register field used for accessing general purpose registers (e.g., general purpose registers 825).

Figure 12A:
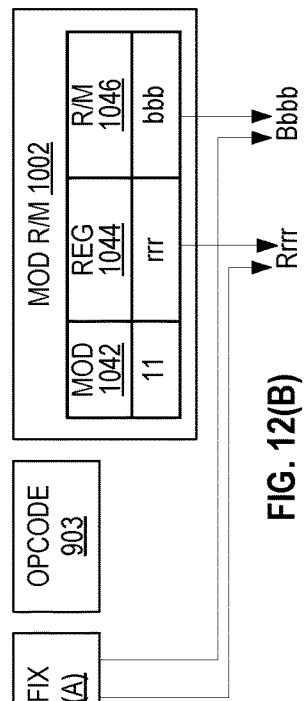
FIGS. 12(A)-(D) illustrate use of fields of a prefix of an instruction format according to embodiment.
Figure 12B:
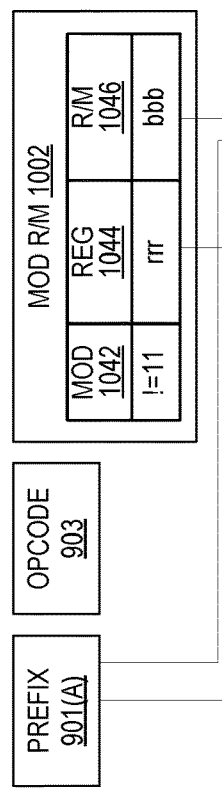
Figure 12C:
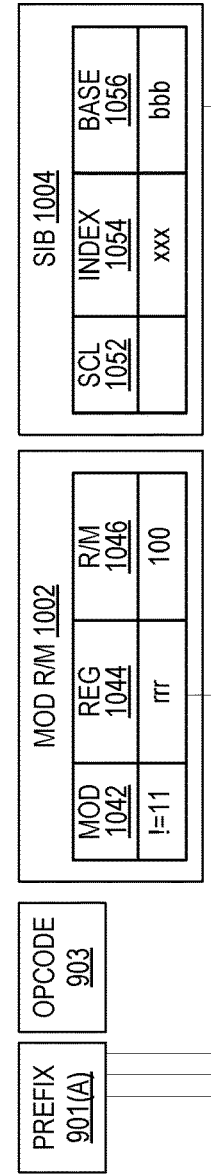
Figure 12D:
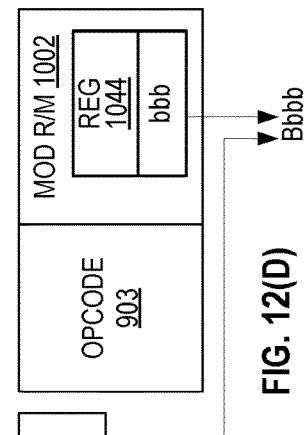

FIGS. 12(A)-(D) illustrate embodiments of how the R, X, and B fields of the first prefix 901(A) are used. FIG. 12(A) illustrates R and B from the first prefix 901(A) being used to extend the reg field 1044 and R/M field 1046 of the MOD R/M byte 1002 when the SIB byte 1004 is not used for memory addressing. FIG. 12(B) illustrates R and B from the first prefix 901(A) being used to extend the reg field 1044 and R/M field 1046 of the MOD R/M byte 1002 when the SIB byte 1004 is not used (register-register addressing). FIG. 12(C) illustrates R, X, and B from the first prefix 901(A) being used to extend the reg field 1044 of the MOD R/M byte 1002 and the index field 1054 and base field 1056 when the SIB byte 1004 being used for memory addressing. FIG. 12(D) illustrates B from the first prefix 901(A) being used to extend the reg field 1044 of the MOD R/M byte 1002 when a register is encoded in the opcode 903.

FIGS. 13(A)-(B) illustrate embodiments of a second prefix 901(B). In some embodiments, the second prefix 901(B) is an embodiment of a VEX prefix. The second prefix 901(B) encoding allows instructions to have more than two operands, and allows SIMD vector registers (e.g., vector/SIMD registers 810) to be longer than 64-bits (e.g., 128-bit and 256-bit). The use of the second prefix 901(B) provides for three-operand (or more) syntax. For example, previous two-operand instructions performed operations such as A=A+B, which overwrites a source operand. The use of the second prefix 901(B) enables operands to perform nondestructive operations such as A=B+C.

In some embodiments, the second prefix 901(B) comes in two forms—a two-byte form and a three-byte form. The two-byte second prefix 901(B) is used mainly for 128-bit, scalar, and some 256-bit instructions; while the three-byte second prefix 901(B) provides a compact replacement of the first prefix 901(A) and 3-byte opcode instructions.

FIG. 13(A) illustrates embodiments of a two-byte form of the second prefix 901(B). In one example, a format field 1301 (byte 0 1303) contains the value C5H. In one example, byte 1 1305 includes a "R" value in bit[7]. This value is the complement of the same value of the first prefix 901(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1046 to encode the instruction operand that references a memory address or encode either the destination register operand or a source register operand.

Instructions that use this prefix may use the Mod R/M reg field 1044 to encode either the destination register operand or a source register operand, be treated as an opcode extension and not used to encode any instruction operand.

For instruction syntax that support four operands, vvvv, the Mod R/M R/M field 1046 and the Mod R/M reg field 1044 encode three of the four operands. Bits[7:4] of the immediate 909 are then used to encode the third source register operand.

FIG. 13(B) illustrates embodiments of a three-byte form of the second prefix 901(B). in one example, a format field 1311 (byte 0 1313) contains the value C4H. Byte 1 1315 includes in bits[7:5] "R," "X," and "B" which are the complements of the same values of the first prefix 901(A). Bits[4:0] of byte 1 1315 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1317 is used similar to W of the first prefix 901(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1046 to encode the instruction operand that references a memory address or encode either the destination register operand or a source register operand.

Instructions that use this prefix may use the Mod R/M reg field 1044 to encode either the destination register operand or a source register operand, be treated as an opcode extension and not used to encode any instruction operand.

For instruction syntax that support four operands, vvvv, the Mod R/M R/M field 1046, and the Mod R/M reg field 1044 encode three of the four operands. Bits[7:4] of the immediate 909 are then used to encode the third source register operand.

Figure 14:
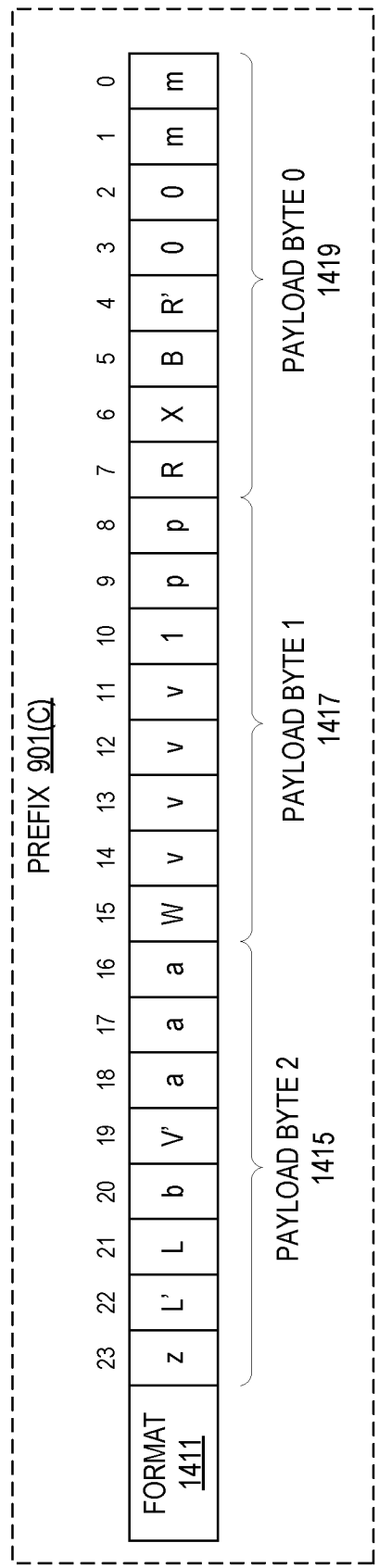

FIG. 14 illustrates embodiments of a third prefix 901(C). In some embodiments, the first prefix 901(A) is an embodiment of an EVEX prefix. The third prefix 901(C) is a four-byte prefix.

The third prefix 901(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 8) or predication utilize this prefix. Opmask register allow for conditional processing or selection control. Opmask instructions, whose source/destination operands are opmask registers and treat the content of an opmask register as a single value, are encoded using the second prefix 901(B).

The third prefix 901(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 901(C) is a format field 1411 that has a value, in one example, of 62H. Subsequent bytes are referred to as payload bytes 1415-1419 and collectively form a 24-bit value of P[23:0] providing specific capability in the form of one or more fields (detailed herein).

In some embodiments, P[1:0] of payload byte 1419 are identical to the low two mmmmm bits. P[3:2] are reserved in some embodiments. Bit P[4] (R') allows access to the high 16 vector register set when combined with P[7] and the ModR/M reg field 1044. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1044 and ModR/M R/M field 1046. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 901(A) and second prefix 911(B) and may serve as an opcode extension bit or operand size promotion.

P[18:16] specify the index of a register in the opmask (writemask) registers (e.g., writemask/predicate registers 815). In some embodiments of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other some embodiments, preserving the old value of each element of the destination where the corresponding mask bit has a 0. In contrast, when zeroing vector masks allow any set of elements in the destination to be zeroed during the execution of any operation (specified by the base operation and the augmentation operation); in some embodiments, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example embodiments of encoding of registers in instructions using the third prefix 901(C) are detailed in the following tables.

TABLE 3

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB. index | GPR | Memory addressing |
| VIDX | V' | X | SIB. index | Vector | VSIB memory addressing |

TABLE 4

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB. index | GPR | Memory addressing |
| VIDX | SIB. index | Vector | VSIB memory addressing |

TABLE 5

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such embodiment approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least some embodiments may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
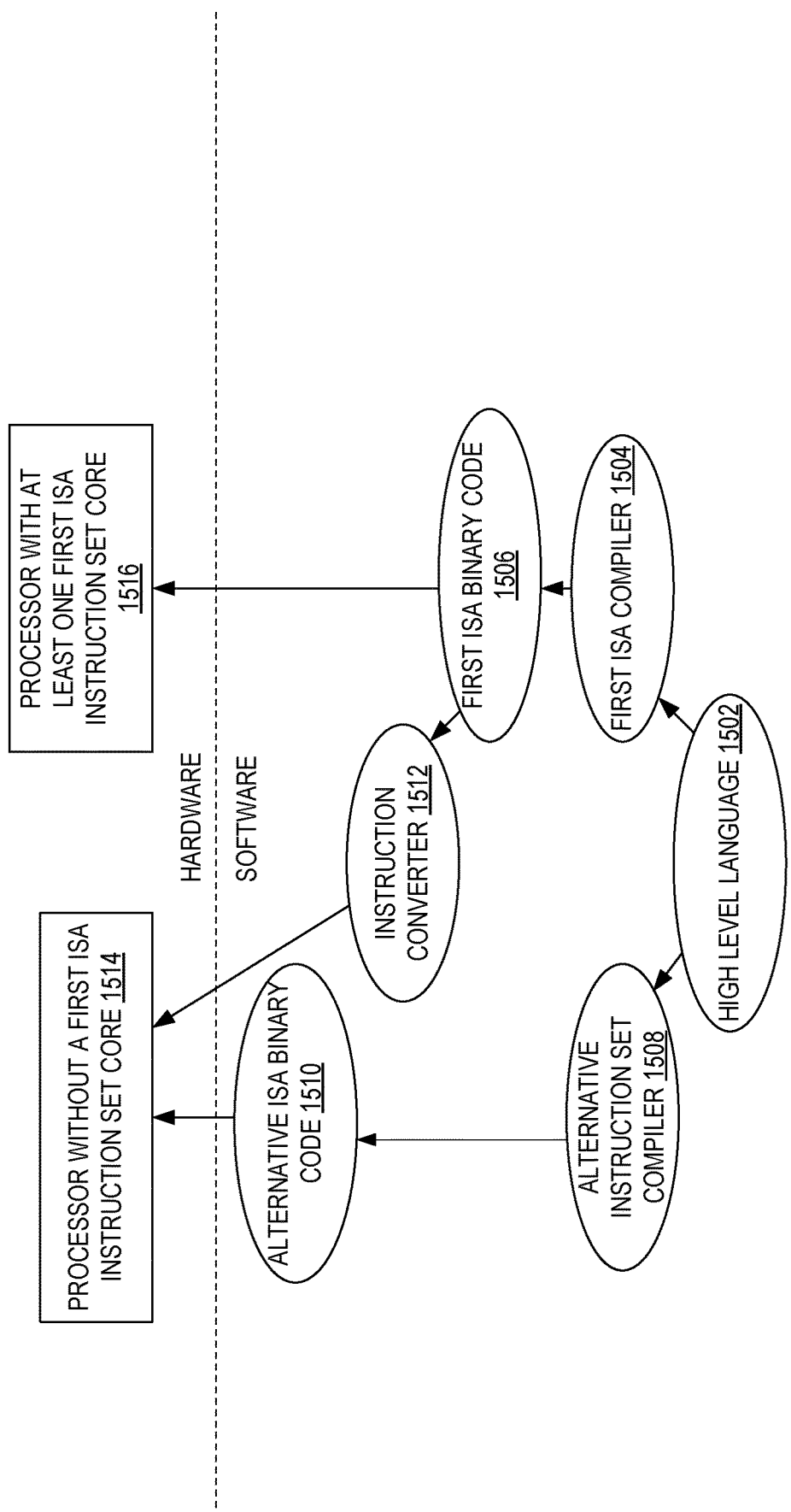
FIG. 15 illustrates a block diagram illustrating binary conversion of instructions according to embodiments.

FIG. 15 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high-level language 1502 may be compiled using a first ISA compiler 1504 to generate first ISA binary code 1506 that may be natively executed by a processor with at least one first instruction set core 1516. The processor with at least one first ISA instruction set core 1516 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1504 represents a compiler that is operable to generate first ISA binary code 1506 (e.g., object code) that can, with or without additional linkage processing, be executed on the processor with at least one first ISA instruction set core 1516. Similarly, FIG. 15 shows the program in the high-level language 1502 may be compiled using an alternative instruction set compiler 1508 to generate alternative instruction set binary code 1510 that may be natively executed by a processor without a first ISA instruction set core 1514. The instruction converter 1512 is used to convert the first ISA binary code 1506 into code that may be natively executed by the processor without a first ISA instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation, or any other process, allows a processor or other electronic device that does not have a first ISA instruction set processor or core to execute the first ISA binary code 1506.

References to "some embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   a plurality of processor cores;
   a local interrupt controller comprising:
   an interrupt controller register; and
   logic to, in response to a write from a virtual machine to the interrupt controller register, record an interprocessor interrupt in a first data structure configured by a virtual machine monitor and send a notification of the interprocessor interrupt to at least one of the plurality of processor cores,
   wherein the interrupt controller register is accessed by software according to a method that depends on a mode of the local interrupt controller, wherein the mode comprises a first mode in which the interrupt controller register is accessed by the software through memory accesses to a specified address, and a second mode in which the interrupt controller register is accessed by the software through a write instruction to a different register.

2. The apparatus of claim 1, wherein the logic is to record the interprocessor interrupt and send the notification from within the virtual machine.

3. The apparatus of claim 2, wherein the at least one of the plurality of processor cores is a processor core on which the virtual machine executes.

4. The apparatus of claim 3, wherein the logic is to reference a second data structure to check that the at least one of the plurality of processor cores is a valid destination, the second data structure to be configured with interrupt controller identifiers corresponding to processor cores in a same subset of processor cores as the processor core on which the virtual machine executes.

5. The apparatus of claim 4, wherein the interrupt controller register has a first field to indicate a destination of the interprocessor interrupt.

6. The apparatus of claim 5, wherein the interrupt controller register has a second field to indicate whether to send the interprocessor interrupt only to the destination indicated in the first field, only to the core on which the virtual machine executes, to all of the subset of processor cores including the core on which the virtual machine executes, or to all of the subset of processor cores excluding the core on which the virtual machine executes.

7. The apparatus of claim 5, wherein the interrupt controller register has a second field to indicate an interrupt vector.

8. The apparatus of claim 5, wherein the interrupt controller register has a second field to indicate a destination mode.

9. The apparatus of claim 5, wherein the interrupt controller register has a second field to indicate a delivery status.

10. The apparatus of claim 1, wherein the interprocessor interrupt is a user-level interrupt.

11. A method comprising:
    configuring, by a virtual machine monitor, a first data structure to record interprocessor interrupts;
    configuring an interrupt controller register of a local interrupt controller to send an interprocessor interrupt from a virtual machine;
    writing, by software running on the virtual machine, to an interrupt controller register;
    recording, in response to writing, the interprocessor interrupt in the first data structure;
    sending, in response to writing, a notification of the interprocessor interrupt to at least one of a plurality of processor cores;
    wherein the method further comprises accessing the interrupt controller register by the software according to a method that depends on a mode of the local interrupt controller, wherein the mode comprises a first mode in which the interrupt controller register is accessed by the software through memory accesses to a specified address, and a second mode in which the interrupt controller register is accessed by the software through a write instruction to a different register.

12. The method of claim 11, wherein recording and sending is performed from within the virtual machine.

13. The method of claim 12, wherein the at least one of the plurality of processor cores is a processor core on which the virtual machine executes.

14. The method of claim 13, wherein the logic is to reference a second data structure to check that the at least one of the plurality of processor cores is a valid destination, the second data structure to be configured with interrupt controller identifiers corresponding to processor cores in a same subset of processor cores as the processor core on which the virtual machine executes.

15. A system comprising:
a system bus;
a plurality of processors coupled to the system bus, at least one of the processors having a plurality of cores;
a local interrupt controller corresponding to one of the processor cores, including:
an interrupt controller register; and
  logic to, in response to a write from a virtual machine to the interrupt controller register, record an interprocessor interrupt in a first data structure configured by a virtual machine monitor and send a notification of the interprocessor interrupt to at least one of the plurality of processor cores;
  wherein the interrupt controller register is accessed by software according to a method that depends on a mode of the local interrupt controller, wherein the mode comprises a first mode in which the interrupt controller register is accessed by the software through memory accesses to a specified address, and a second mode in which the interrupt controller register is accessed by the software through a write instruction to a different register.

16. The system of claim 15 further comprising an input/output interrupt controller coupled to the system bus.

* * * * *